United States Patent
Nishida

(10) Patent No.: US 7,953,715 B2
(45) Date of Patent: May 31, 2011

(54) FILE PROCESSING DEVICE, FILE TRANSMISSION DEVICE, AND CORRESPONDING METHODS

(75) Inventor: Akinori Nishida, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 439 days.

(21) Appl. No.: 11/973,048

(22) Filed: Oct. 4, 2007

(65) Prior Publication Data

US 2008/0109643 A1 May 8, 2008

(30) Foreign Application Priority Data

Oct. 4, 2006 (JP) .................................. 2006-273379
Aug. 29, 2007 (JP) .................................. 2007-222986

(51) Int. Cl.
*G06F 7/00* (2006.01)
*G06F 12/00* (2006.01)
*G06F 17/00* (2006.01)
*G06F 17/30* (2006.01)

(52) U.S. Cl. ......... 707/703; 707/704; 707/812; 707/826

(58) Field of Classification Search .............. 707/103 R, 707/103 X, 103 Y, 103 Z, 610, 613, 628, 707/703, 812, 826, 687, 704
See application file for complete search history.

(56) References Cited

U.S. PATENT DOCUMENTS

| | | | |
|---|---|---|---|
| 5,716,148 A * | 2/1998 | Tamagaki | 400/74 |
| 7,028,182 B1 * | 4/2006 | Killcommons | 713/161 |
| 7,154,619 B1 * | 12/2006 | Yoshida et al. | 358/1.14 |
| 2001/0043723 A1 * | 11/2001 | Kadota et al. | 382/113 |
| 2001/0046065 A1 * | 11/2001 | Furukawa et al. | 358/1.15 |
| 2003/0056672 A1 * | 3/2003 | Ueda et al. | 101/483 |
| 2005/0152378 A1 * | 7/2005 | Bango et al. | 370/400 |
| 2005/0237562 A1 * | 10/2005 | Seo | 358/1.14 |
| 2006/0050313 A1 * | 3/2006 | Hashimoto et al. | 358/1.15 |
| 2006/0077976 A1 * | 4/2006 | Park | 370/392 |

OTHER PUBLICATIONS

"IrSimple, a High-Speed Infrared Communication Protocol Adopted as a Global Standard," ITX E-Globaledge Corporation, search of Jul. 17, 2006 (with English translation).

* cited by examiner

*Primary Examiner* — Shahid A Alam
*Assistant Examiner* — Mark E Hershley
(74) *Attorney, Agent, or Firm* — Nutter McClennen & Fish LLP; John J. Penny, Jr.; Christina M. Sperry

(57) ABSTRACT

Upon receiving a plurality of image files transmitted from a portable telephone 80, a multifunction printer 10 stores, of the image files received this time, the file name of an image file with no data loss into a RAM 76, and controls a printer unit 20 so that print processing of the image file with no data loss is executed. Thereafter, upon receiving the same plurality of image files again, the multifunction printer 10 controls the printer unit 20 so that print processing is executed with respect to, of the image files received this time, a file whose file name was not stored into the RAM 76 as a file with no data loss last time and which is determined to be a file with no data loss this time.

12 Claims, 14 Drawing Sheets

FIG. 7
(a) MESSAGE 1
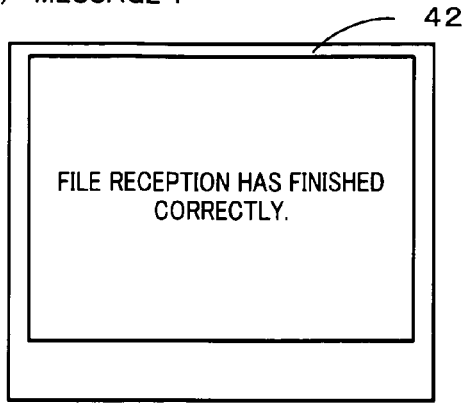
(b) MESSAGE 2
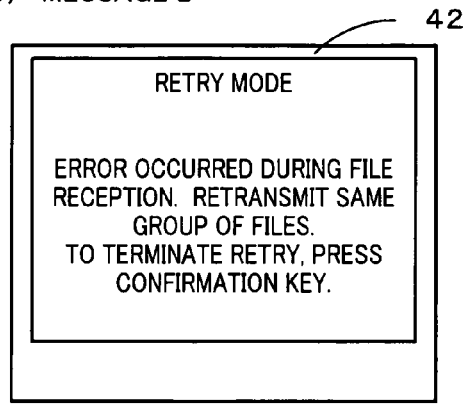
(c) MESSAGE 3
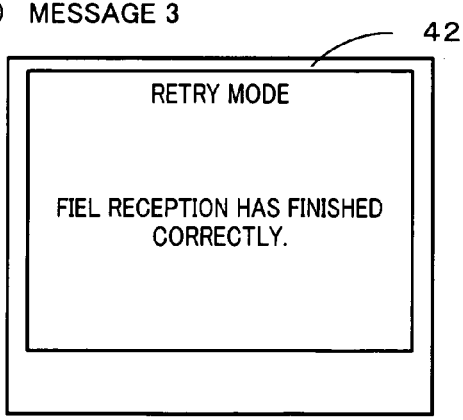
(d) MESSAGE 4
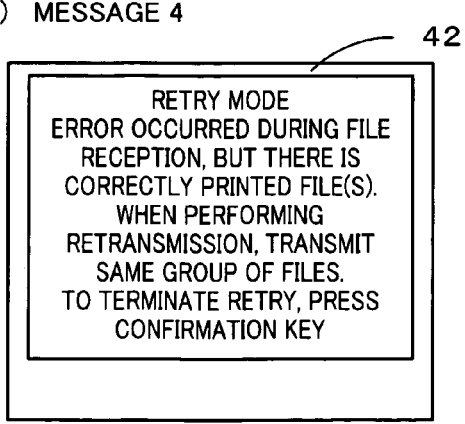

FIG. 12

(a) FIRST TRANSFER

SEQUENCE NUMBER 0   OK (STORE)
SEQUENCE NUMBER 1   NG (NOT STORED YET)
SEQUENCE NUMBER 2   OK (STORE)                } IMAGE FILE P
SEQUENCE NUMBER 3   NG (NOT STORED YET)
SEQUENCE NUMBER 4   OK (STORE)

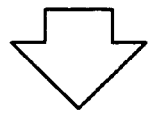

(b) SECOND TRANSFER

SEQUENCE NUMBER 0   OK (ALREADY STORED)
SEQUENCE NUMBER 1   OK (STORE)
SEQUENCE NUMBER 2   NG (ALREADY STORED)        } IMAGE FILE P
SEQUENCE NUMBER 3   OK (STORE)
SEQUENCE NUMBER 4   NG (ALREADY STORED)

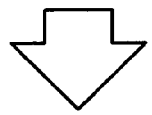

PRINT IS EXECUTED SINCE ALL PACKETS OF
IMAGE FILE P HAVE BEEN RECEIVED

FILE PROCESSING DEVICE, FILE TRANSMISSION DEVICE, AND CORRESPONDING METHODS

BACKGROUND OF THE INVENTION

1. Field of the Invention

The present invention relates to a file processing device, a file transmission device, and corresponding methods.

2. Description of the Related Art

In the related art, the infrared data communications protocol based on the IrDA (Infrared Data Association) standard is adopted for many various information devices such as PDAs, personal computers, portable telephones, and portable printers. In August 2005, with a view to realizing high-speed communication in data transfer of large capacity content, IrSimple was adopted as an international standard (see Non-patent Document 1). In addition to existing applications, new applications of this IrSimple standard are anticipated. The IrSimple standard proposes a procedure for not only two-way communication but also one-way communication. For example, when transferring image data from a data transmission device such as a portable telephone or a digital still camera to a data receiving device such as a printer, if the procedure for one-way communication is adopted, the user can perform high-speed transfer of image data. If the printer supports so-called direct print, after transfer of image data, the transmitted image data is printed onto a sheet by the printer. A schematic diagram of the IrSimple layer structure is shown in FIG. 15.

[Non-patent Document 1] ITX E-Globaledge Corporation, and three other companies, "Press Release Article", [Online] Aug. 26, 2005, NTT Docomo, [Searched on Jul. 17, 2006], Internet <URL:http://www.nttdocomo.co.jp/info/news_release/page/20050826.h tml>

SUMMARY OF THE INVENTION

However, when transferring an image file from a portable telephone as a data transmission device to a printer as a data receiving device by one-way communication based on the IrSimple standard and executing printing of the image file, there are times when the image file is not printed if the printer cannot receive that image file, even though the image file is transmitted from the portable telephone. At this time, in order to print image files transmitted to the printer without an overlap, the user is required to check the printed image file by looking at the sheet outputted from the printer, and select other image files (that is, image files that have been transmitted to the printer but have not been printed yet) and transmit the image files again, which is a very cumbersome process. That said, if the same image files as the last transmitted image files are transmitted without removing the printed image file, the image file that has already been printed is printed again.

The present invention has been made in view of the above-described problems, and accordingly it is an object of the present invention to provide a file processing device and a file processing method with which, when a user retransmits a plurality of files in one-way communication, the retransmission can be performed by a simple operation, and output processing of the same file is not executed repeatedly. It is another object of the present invention to provide a file transmission device and a file transmission method which are suitable for transmitting a plurality of files to such a file processing device by one-way communication.

In order to accomplish at least some of the above-mentioned objects, the present invention adopts the following means.

A file processing device of the present invention includes: a receiving module that receives a plurality of files as a batch of files from a communicating party by one-way communication; a processing execution module that executes predetermined output processing on the basis of files received by the receiving module; and a processing control module which, if a file with no data loss exists in the batch of files received by the receiving module, controls the processing execution module to execute the predetermined output processing on the basis of the file with no data loss, and which, if a file with data loss exists in the batch of files received by the receiving module, waits for the receiving module to receive the batch of files again, and when the receiving module receives the batch of files again, controls the processing execution module to execute the predetermined output processing on the basis of a file in the batch of files for which the predetermined output processing has not been executed and whose data loss has been corrected.

According to this file processing device of the invention, if a file with no data loss exists in the batch of files received by the receiving module, the processing execution module is controlled so that predetermined output processing is executed on the basis of that file. On the other hand, if a file with data loss exists in the batch of files received by the receiving module, it is waited for the receiving module to receive the same batch of files again. Then, when the receiving module receives the batch of files again, the processing execution module is controlled so that predetermined output processing is executed on the basis of a file in the batch of files for which predetermined output processing has not been executed and whose data loss has been corrected. Accordingly, the user may simply retransmit the same batch of files as the last one as it is, without performing such cumbersome operation as reselecting an image file for which predetermined output processing has not been executed and retransmitting the image file, so retransmission can be performed by a simple operation. Further, it is possible to avoid a situation where, when the same batch of files as that transmitted last time is transmitted this time by the user as it is, output processing is repeatedly executed also this time with respect to a correct file for which a command for predetermined output processing was outputted last time.

In this case, the predetermined output processing may be either print output processing with respect to a printing module such as a printer, display output processing with respect to a display module such as a display, sound output processing with respect to a singing module such as a speaker, or storage processing with respect to a storage module such as a memory card or a hard disk recorder.

In one preferable structure, the file processing device of the invention further includes a storage module that stores identifiers of files received by the receiving module, and the processing control module stores, of a plurality of files included in the batch of files received by the receiving module, an identifier of a correct file with no data loss and an identifier of an erroneous file with data loss in a different manner from each other into the storage module. If a correct file exists in the batch of files, the processing control module controls the processing execution module to execute the predetermined output processing on the basis of the correct file. If an erroneous file exists in the batch of files, on the other hand, the processing control module waits for the receiving module to receive the batch of files from the communicating party again, and when the receiving module receives the batch of files from the communicating party again, the processing control module controls the processing execution module regards only an identifier of a file which has not been stored in the storage module as a correct file up until the last reception time and which is determined to be a correct file this reception time as an identifier of a correct file and executes the predetermined output processing on the basis of the file. Since the identifier of a correct file with no data loss and the identifier of an erroneous file with data loss are thus stored into the storage module in a different manner from each other, it is possible to carry out the present invention relatively easily by making use of the storage contents of the storage module.

The file processing device of the invention having the storage module may further include a notifying module for notifying a user of information. If an erroneous file exists in the batch of files, the processing control module may control the notifying module so as to urge a user to retransmit the batch of files, and waits for the receiving module to receive the batch of files from the communicating party again. In this way, even in the case of one-way communication, the user can learn that retransmission of a batch of files is required, which proves highly convenient. In this case, the processing control module may control the notifying module so as to urge the user to retransmit the batch of files, if an erroneous file exists in the batch of files and predetermined output processing of the erroneous file has not been executed.

The file processing device of the invention having the storage module may further include a cancellation instruction inputting module that allows a user to input a standby cancellation instruction for canceling a standby state in which retransmission of the batch of files is waited for. If an erroneous file exists in the batch of files, the processing control module may determine whether or not the standby cancellation instruction has been inputted by a user via the cancellation instruction inputting module, and if the standby cancellation instruction has been inputted, the processing control module may control the storage module so as to reset a storage state with respect to the identifier. In some cases, once output processing is performed with respect to the very file whose output processing is desired by the user who has transmitted a batch of files, even if other erroneous files exist, output processing of the erroneous files is no longer desired. In such a case, it is possible to cancel a standby state in which retransmission of the batch of files is waited for.

Further, in the file processing device of the invention which has the storage module, the processing control module may use a file name as the identifier. Since different names are given to different files in most cases, by using a file name as the identifier, it is possible to easily differentiate a correct file and an erroneous file from each other. In addition to this, the creation date, hour, minute, and second of a file, the size of a file, or the like can be also used as the identifier.

In another preferable structure of the file processing device of the invention, the receiving module receives the plurality of files from the communicating party on a packet-by-packet basis by one-way communication. If a file with all of its packets present exists in the batch of files, the processing control module controls the processing execution module executes the predetermined output processing on the basis of the file with all of its packets present. If a file with any of its packets missing exists in the batch of files, on the other hand, the processing control module waits for the receiving module to receive the batch of files from the communicating party again on a packet-by-packet basis, and when the receiving module receives the batch of files from the communicating party again on a packet-by-packet basis, the processing control module controls the processing execution module to execute the predetermined output processing on the basis of a file in the batch of files, for which the predetermined output processing has not been executed and all packets have been completed. In this way, with respect to a given file in the batch of files, even if there was a missing packet at the first reception, output processing is executed if the missing packet is received and all the packets are completed at the second reception or later. That is, with respect to that file, even if some of its packets are missing every time it is received, output processing is executed if all the packets are completed by collecting the packets correctly received each time. Therefore, even in situations where a reception error is liable to occur, output processing of individual files included in a batch of files can be executed relatively early.

In the file processing device of the present invention which receives a plurality of files on a packet-by-packet basis, the processing control module may store into a predetermined packet storing module a correct packet that has been correctly received by the receiving module. If a file with all of its packets stored in the packet storing module as correct packets exists in the batch of files, the processing control module may control the processing execution module to execute the predetermined output processing on the basis of the file. If a file with any of its packets not stored in the packet storing module as a correct packet exists in the batch of files, on the other hand, the processing control module may wait for the receiving module to receive the batch of files from the communicating party again on a packet-by-packet basis, and when the receiving module receives the batch of files from the communicating party again on a packet-by-packet basis, the processing control module may control the processing execution module to execute the predetermined output processing on the basis of a file in the batch of files, for which the predetermined output processing has not been executed and all packets are stored in the packet storing module as correct packets.

The file processing device of the invention receiving a plurality of files on a packet-by-packet basis may further include a notifying module for notifying a user of information, and as the receiving module receives the batch of files from the communicating party again on a packet-by-packet basis, when all packets are completed with respect to the last file of the batch of files for which the predetermined output processing has not been executed, the processing control module may control the notifying module to notify a user of an immediate end of reception before reception of the remaining packets of the file ends. In this way, the retransmission time can be shortened.

A file processing method of the present invention uses computer software and is a method for receiving a plurality of files as a batch of files from a communicating party by one-way communication, and executing predetermined output processing on the basis of the received files. The file processing method includes the steps of: (a) controlling the processing execution module, if a file with no data loss exists in the batch of files received from the communicating party, to execute the predetermined output processing on the basis of the file with no data loss; and (b) waiting for the receiving module to receive the batch of files from the communicating party again if a file with data loss exists in the batch of files received from the communicating party, and when the receiving module receives the batch of files from the communicating party again, controlling the processing execution module to execute the predetermined output processing on the basis of a file, for which when data loss is corrected with respect to a file in the batch of files for which the predetermined output processing has not been executed and whose data loss has been corrected.

According to this file processing method, the user may simply retransmit the same batch of files as that transmitted last time, without performing such cumbersome operation as reselecting a file for which predetermined output processing has not been executed and retransmitting the file, so retransmission can be performed by a simple operation. Further, it is possible to avoid a situation where, when the same batch of files as that transmitted last time is transmitted this time by the user as it is, output processing is repeatedly executed also this time with respect to a correct file for which a command for predetermined output processing was outputted last time. It should be noted that steps for realizing the operations/functions provided by individual components included in the file processing device according to the present invention described above may be added.

A program according to the present invention causes one or a plurality of computers to execute the individual steps of the file processing method described above. This program may be recorded in a computer-readable recording medium (for example, a hard disk, a ROM, an FD, a CD, or a DVD), may be distributed from a given computer to another computer via a transmission medium (communication network such as the Internet or LAN), or may be exchanged in any other form. When this program is executed by a single computer or executed by a plurality of computers in a distributed manner, the individual steps of the file transmission method described above are executed, thus providing the same effect as that of the file transmission method described above.

A file transmission device of the present invention includes: a transmitting module that can transmit a plurality of files selected as transmission objects to a communicating party as a batch of files by one-way communication; a transmission instruction inputting module that allows a user to input a transmission instruction for the batch of files; a retransmission instruction inputting module that allows a user to input a retransmission instruction for the batch of files; and a transmission control module which, when the transmission instruction is inputted by a user via the transmission instruction inputting module, controls the transmitting module to transmit the batch of files to the communicating party, and when the retransmission instruction is inputted by a user via the retransmission instruction inputting module thereafter, controls the transmitting module to transmit the batch of files to the communicating party again.

In this file transmission device, when a transmission instruction is inputted by the user via the transmission instruction inputting module, the transmitting module is controlled so that a batch of files is transmitted to the communicating party, and when a retransmission instruction is inputted by the user via the retransmission instruction inputting module thereafter, the transmitting module is controlled so that the same batch of files as that transmitted last time is transmitted again. In this way, the user can easily retransmit the same batch of files. It can be thus said that the file transmission device according to the present invention is a device suitable for transmitting a plurality of files to the file receiving device according to the present invention described above.

A file transmission method of the present invention uses computer software and is a method for transmitting a plurality of files selected as transmission objects to a communicating party as a batch of files by one-way communication. The file transmission method includes the steps of: (a) transmitting the batch of files to the communicating party when a transmission instruction is inputted by a user; and (b) transmitting the batch of files to the communicating party again when a retransmission instruction is inputted by a user thereafter.

According to this file transmission method, the user can easily retransmit the same batch of files. It can be thus said that the file transmission method according to the present invention is a method suitable for realizing the above-described file processing method according to the present invention.

A program according to the present invention causes one or a plurality of computers to execute the individual steps of the file transmission method described above. This program may be recorded in a computer-readable recording medium (for example, a hard disk, a ROM, an FD, a CD, or a DVD), may be distributed from a given computer to another computer via a transmission medium (communication network such as the Internet or LAN), or may be exchanged in any other form. When this program is executed by a single computer or executed by a plurality of computers in a distributed manner, the individual steps of the file transmission method described above are executed, thus providing the same effect as that of the file transmission method described above.

BRIEF DESCRIPTION OF THE DRAWINGS

FIG. 7 is a schematic diagram showing examples of display made on a display section 42 of a multifunction printer 10.

FIG. 12 is a schematic diagram showing a transfer procedure and reception results.

DESCRIPTION OF THE PREFERRED EMBODIMENTS

Next, embodiments of the present invention will be described with reference to the drawings.

First Embodiment

Figure 1:
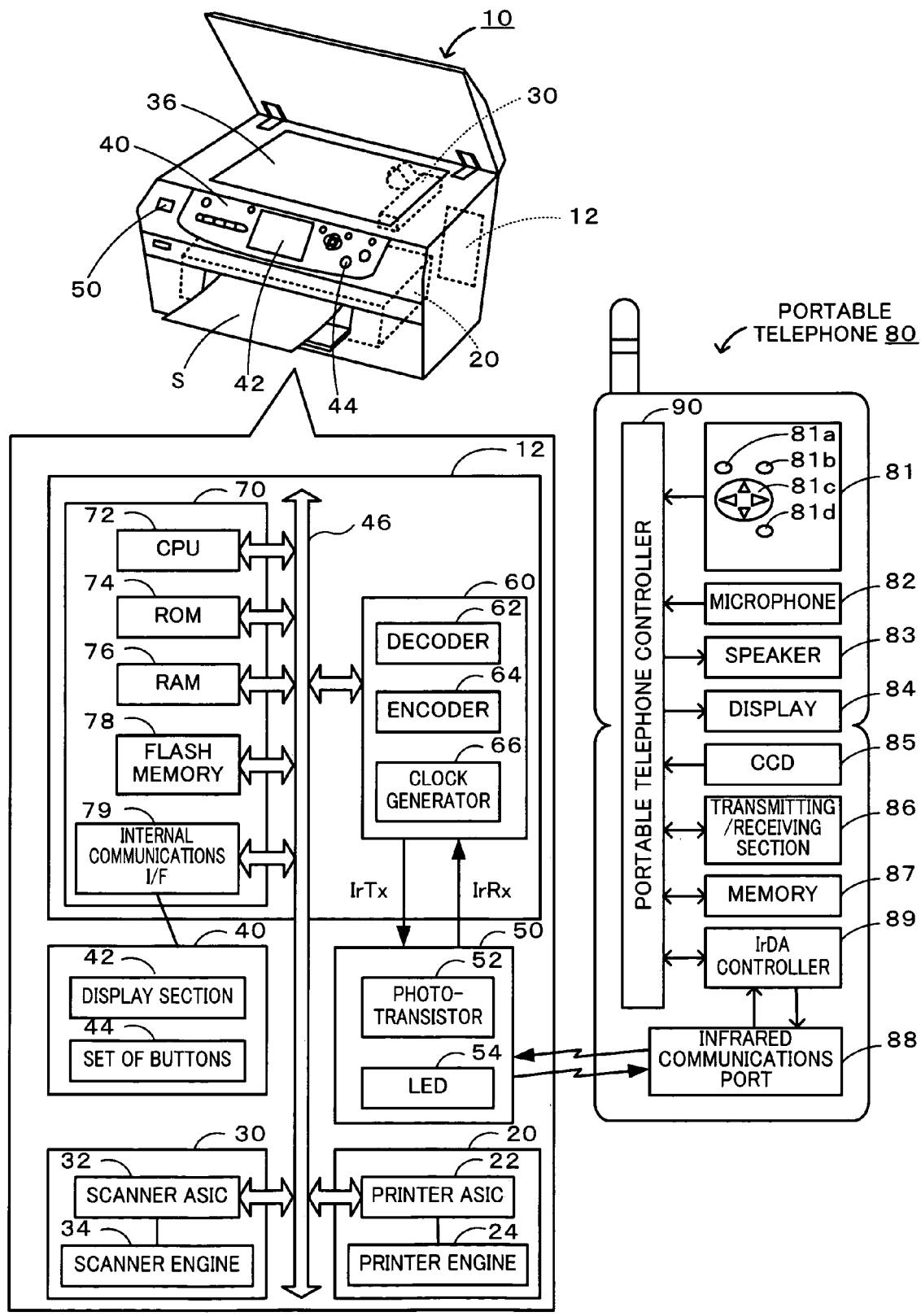
FIG. 1 is an exterior view and block diagram of a multifunction printer 10.

Next, embodiments of the present invention will be described with reference to the drawings. FIG. 1 is an exterior view and block diagram showing the schematic configuration of a multifunction printer 10 as an embodiment of a file processing device according to the present invention.

As shown in FIG. 1, the multifunction printer 10 according to this embodiment includes a printer unit 20 that executes printing on a sheet S on the basis of a print job, a scanner unit 30 that reads a document placed on a glass stand 36, an infrared communications port 50 for receiving and transmitting infrared radiation, an IrDA controller 60 that controls the infrared communications port 50 to perform data transmission and reception to and from or only data reception from a portable telephone 80 as infrared communications equipment, an operation panel 40 for displaying various kinds of information on a display section 42 and for inputting a user's instruction through operation on a set of buttons 44, and a main controller 70 that is responsible for the control of the entire device. The IrDA controller 60 and the main controller 70 are mounted on a board 12 and accommodated within the multifunction printer 10. The multifunction printer 10 is configured so that the printer unit 20, the scanner unit 30, the IrDA controller 60, and the main controller 70 can exchange various kinds of control signal or data via a bus 46.

The printer unit 20 includes a printer ASIC 22 and a printer engine 24. The printer ASIC 22 is an integrated circuit for controlling the printer engine 24. Upon receiving a print command from the main controller 70, the printer ASIC 22 controls the printer engine 24 so as to perform printing on the sheet S on the basis of an image file as the object of that print command. Further, the printer engine 24 is configured as a known ink-jet type color printer mechanism that performs printing by ejecting ink onto a sheet from a print head. ASIC is an abbreviation of Application Specific Integrated Circuit.

The scanner unit 30 includes a scanner ASIC 32 and a scanner engine 34. The scanner ASIC 32 is an integrated circuit for controlling the scanner engine 34. Upon receiving a scan command from the main controller 70, the scanner ASIC 32 controls the scanner engine 34 so as to read a document placed on the glass stand 36 as image data. Further, the scanner engine 34 includes a known color image sensor, which is configured as a known image scanner and decomposes reflected light that has been emitted toward a document into the colors of red (R), green (G), and blue (B).

The infrared communications port 50 is provided by the side of the operation panel 40 of the multifunction printer 10 so that a phototransistor 52 can receive infrared radiation emitted by the portable telephone 80, and an LED 54 can emit infrared radiation toward the portable telephone 80. The infrared communications port 50 is capable of performing communication according to a communication scheme conforming to the IrDA standard and IrSimple standard. The communication scheme conforming to the IrDA standard is used for two-way communication. For example, when performing image transfer of 500 kbyte in the IrDA-4M scheme from the portable telephone 80 to the multifunction printer 10, first, after a device discovery procedure (500 msec to 1 sec) or device connection procedure (300 msec to 500 msec) at 9600 bps, data is transferred at 4 Mbps while performing two-way communication, so the image transfer takes a total of approximately three seconds. On the other hand, the communication scheme conforming to the IrSimple standard is of two kinds, two-way communication and one-way communication. For example, when performing image transfer of 500 kbyte through one-way communication from the portable telephone 80 to the multifunction printer 10, first, a device connection procedure is executed at 9600 bps, and then data is transferred at 4 Mbps in a one-sided manner, so the image transfer takes no more than one second. While both the phototransistor 52 and the LED 54 are used at the time of two-way communication, only the phototransistor 52 is used and the LED 54 is not used at the time of one-way communication.

The IrDA controller 60 includes a decoder 62 for converting a voltage signal IrRx, which is outputted from the infrared communications port 50 as infrared radiation is received by the phototransistor 52 of the infrared communications port 50, into a data sequence of a binary value (value 0 and value 1), an encoder 64 for generating a voltage signal IrTx, which is outputted to the infrared communications port 50 in order to drive the LED 54 of the infrared communications port 50, from the binary data sequence, and a clock generator 66 that generates a sampling clock specifying the timing of conversion between each of the voltage signals IrRx, IrTx and the binary data sequence. The clock generator 66 is capable of generating different sampling clocks corresponding to two different speeds (which in this embodiment are 9600 bps and 4 Mbps). Further, the infrared communications port 50 and the IrDA controller 60 are electrically connected to each other so that the signal IrRx outputted from the infrared communications port 50 is inputted to the IrDA controller 60, and the signal IrTx outputted from the IrDA controller 60 is inputted to the infrared communications port 50.

Figure 2:
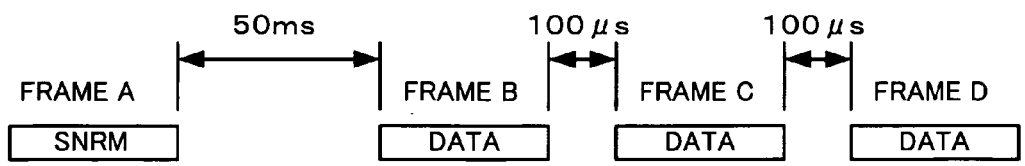
FIG. 2 is a schematic diagram showing frames used in data transfer by one-way communication.
Figure 3:
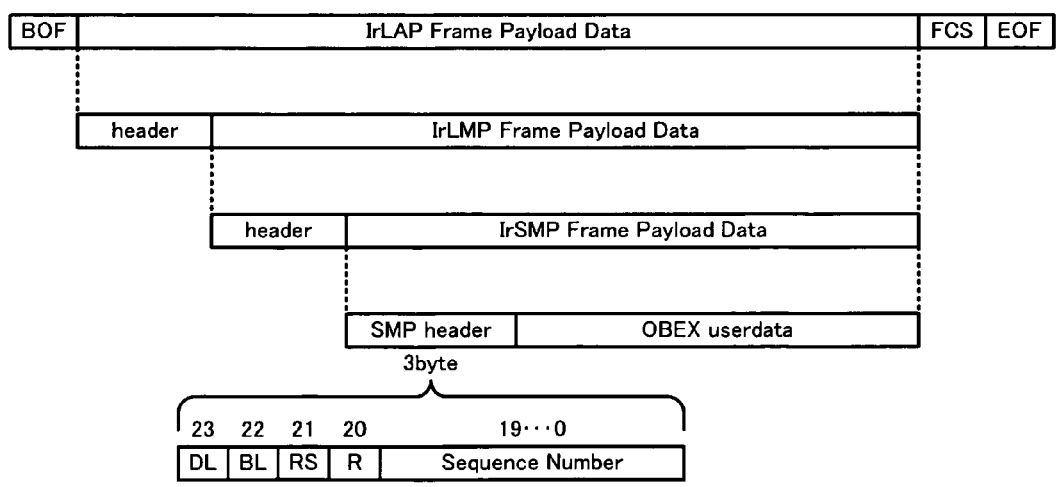
FIG. 3 is a schematic diagram showing the frame format structure at the time of data transfer by IrSMP.

Description will now be given of one-way communication according to the IrSimple standard with reference to FIG. 2. FIG. 2 is a schematic diagram illustrating frames used for data transfer by IrSimple one-way communication. Frames used in data transfer include a frame A containing the SNRM (Set Normal Response Mode) command, which is used as a connecting signal, frames B, C, D containing data to be transmitted (for example, image data obtained by splitting an image file selected by the user), and a disconnection frame used as a disconnecting signal (not shown). At the time of data transfer, first, the frame A is transferred at 9600 bps, and then, after 50 msec, the frame B is transferred at 4 Mbps. Thereafter, after an interval of 100 µsec, the frames C, D are similarly transferred at 4 Mbps. At this time, each frame includes various kinds of header of a PUT command of the OBEX (Object Exchange) protocol for realizing a file transfer function, a header of the IrSimple protocol that is one of the protocols for realizing communication based on the IrSimple standard, and the like. A NAME header which is one of the headers of the PUT command is included in the frame that is transmitted first at the time when files are transmitted, and the file name of a file to which data included in that frame belongs to is described in the NAME header. Further, an ENDBODY header which is one of the headers of the PUT command is included in the frame that is transmitted last at the time when files are transmitted. Further, the header of the IrSMP protocol is included in each frame. Consecutive sequence numbers that are given to the frames in the order of transmission are described in the header of the IrSMP protocol. Here, the frame format at the time of data transfer by IrSMP is shown in FIG. 3. Frames include a begin-of-frame (BOF), payload data, a frame check sequence (FCS), and an end-of-frame (EOF). In this example, a cyclic redundancy check (CRC) is stored as the FCS. CRC is data of 32 bits in the IrDA standard, and is calculated in accordance with payload data, so the CRC can be regarded as a value unique to each packet. Payload data includes an SMP header and OBEX user data. The SMP header is 3 byte (24 bit) in size, and includes a data last bit (DL) and a block last bit (BL), a sequence number, and the like. The DL and BL are set to the value 1 at the time when the last packet is sent by the transmitting side by one-way communication, and set to the value 0 at other times. The sequence number represents data of 20 bits that is incremented for each packet by the transmitting side. Further, in this embodiment, the OBEX user data represents data obtained by splitting an image file into a plurality of parts.

The operation panel 40 includes the display section 42 and the set of buttons 44. The display section 42 is a liquid crystal display, and displays information relating to the print status, data reception status, and the like, a print menu, and the like. The set of buttons 44 includes a power button or arrow key, a determination button, a cancel button, and the like, and is a device that allows input of a user's instruction to the main controller 70 via an internal communications interface 79 when an appropriate one of the buttons is depressed at the time of selecting a menu item, executing a print, or the like while a print menu is displayed.

The main controller 70 is configured as a microprocessor centered on a CPU 72, and includes a ROM 74 that stores various kinds of processing program or various kinds of data, various kinds of table, and the like, a RAM 76 that temporarily stores scan data or print data, a flash memory 78 which is electrically re-writable and whose data is retained even after power is shut off, and the internal communications interface 79 that enables communication with the operation panel 40. These components are connected to each other so as to allow exchange of signals via the bus 46. The main controller 70 receives an input of various kinds of actuating signal or various kinds of detection signal from the printer unit 20 or the scanner unit 30, or the IrDA controller 60, or receives an input of an operation signal generated in accordance with an operation on the set of buttons 44 of the operation panel 40. Further, the main controller 70 outputs a command to the printer unit 20 so as to execute printing of an image file received from the portable telephone 80, outputs a command to the scanner unit 30 so as to read a document placed on the glass stand 36 as image data on the basis of a scan command from the set of buttons 44 of the operation panel 40, outputs to the IrDA controller 60 data to be transmitted to the transmission destination by infrared communications, or outputs a control command of the display section 42 to the operation panel 40.

As shown in FIG. 1, the portable telephone 80 incorporates an infrared communications function conforming to the IrDA standard or IrSimple standard. The portable telephone 80 includes a set of operation buttons 81 including a determination button 81a, a cancel button 81b, an arrow key 81c, a button 81d assigned with a function as an Ir high-speed transmission button (hereinafter, referred to as "Ir high-speed transmission button") 81d, a ten-key keypad (not shown), and the like, a microphone 82 for collecting voice spoken in the ear piece, a speaker 83 for outputting sound to the external via the mouth piece, a display 84 that displays various kinds of screen (image), a CCD camera 85 that photographs an image, a transmitting/receiving section 86 as a data input/output interface of a portable telephone network, a memory 87 in which various kinds of file can be temporarily stored, an infrared communications port 88 for receiving/emitting infrared radiation, an IrDA controller 89 that controls the infrared communications port 88 to perform reception/transmission of data from/to external infrared communications equipment (for example, the multifunction printer 10), and a portable telephone controller 90 that is responsible for the control of the entire portable telephone. In this case, the memory 87 stores a telephone directory file created sequentially through operations on the set of buttons 81, a send-mail file containing mails that have been sent to or are going to be sent to another portable telephone, a personal computer, or the like via the transmitting/receiving section 86, a received-mail file containing mails that have been received from another portable telephone, a personal computer, or the like via the transmitting/receiving section 86, a memo pad file created through operations on the set of operation buttons 81, image files of images photographed by the CCD camera 85, and the like. The infrared communications port 88 and the IrDA controller 89 are of the same configuration as the infrared communications port 50 and IrDA controller 60 of the multifunction printer 10. The portable telephone controller 90 executes various kinds of control. According to one of such controls, the portable telephone controller 90 transmits one or more image files selected from among the image files in the memory 87 to the multifunction printer 10 via the above-described infrared communications port 88 and IrDA controller 89, when the Ir high-speed transmission button 81d of the set of operation buttons 81 is depressed and a transmission command for transmission in one-way communication conforming to the IrSimple standard is inputted.

Next, a description will be given of operation of the multifunction printer 10 and portable telephone 80 according to this embodiment configured as described above, in particular, an operation in the case where a plurality of image files (batch of files) are transmitted from the portable telephone 80 to the multifunction printer 10 by one-way communication conforming to the IrSimple standard, and the image files are printed by the multifunction printer 10.

Figure 4:
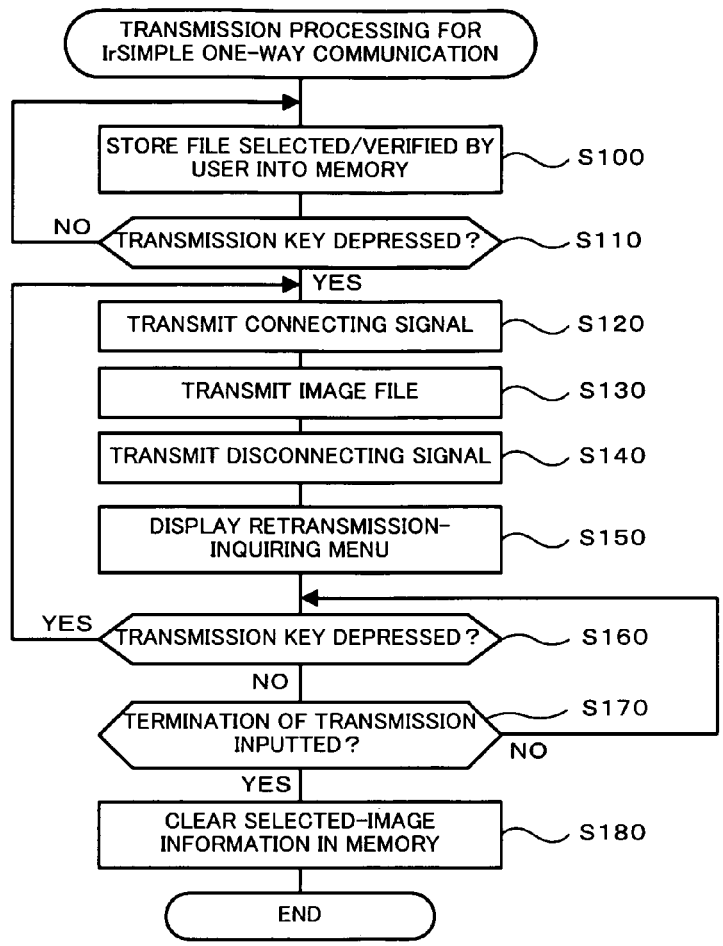
FIG. 4 is a flow chart showing an example of transmission processing by one-way communication.
Figure 5:
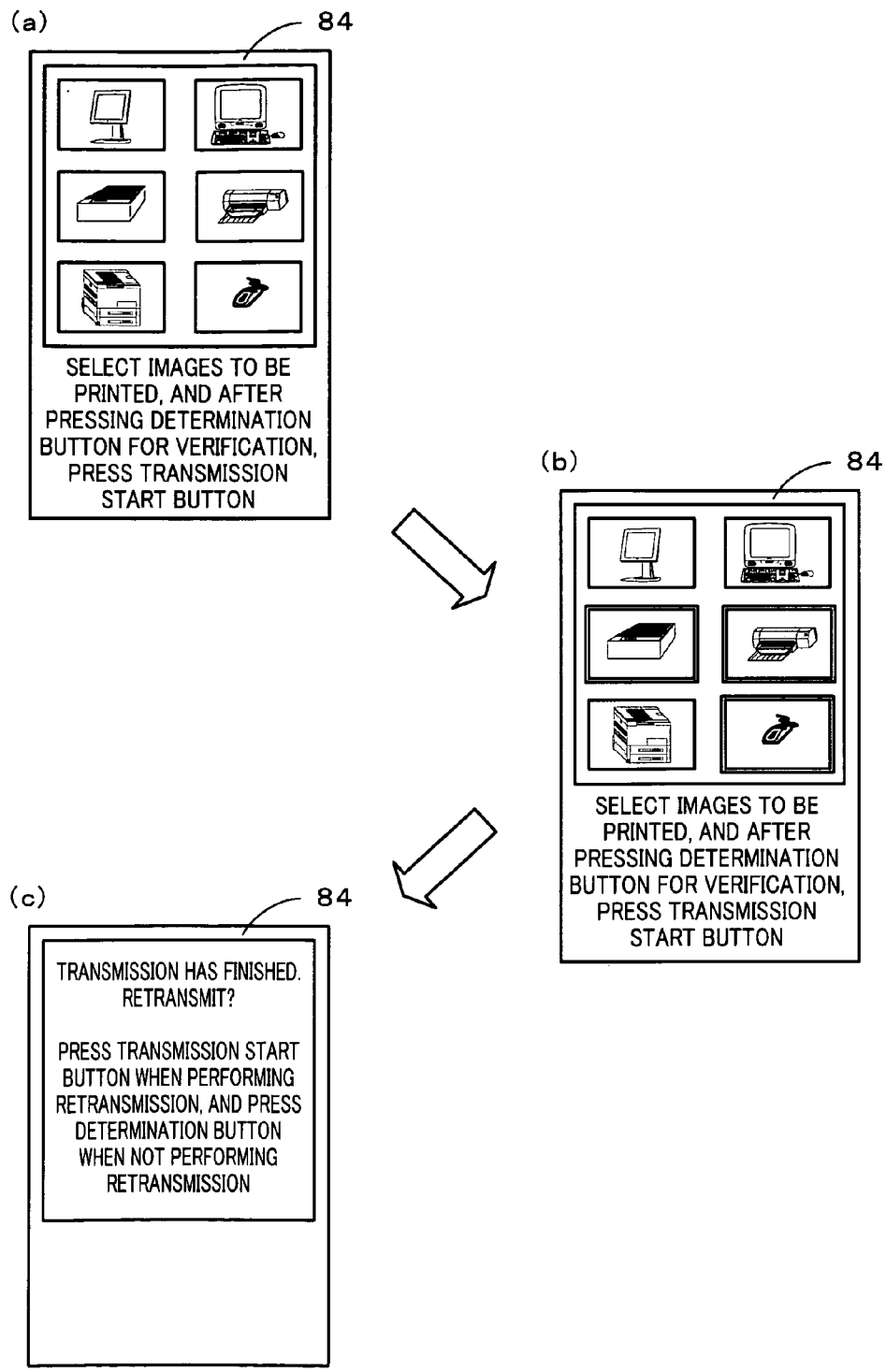
FIG. 5 is a schematic diagram showing examples of display made on a display 84 of a portable telephone 80.

First, operation of the portable telephone 80 will be described. FIG. 4 is a flow chart showing an example of transmission processing routine for IrSimple one-way communication executed by the portable telephone controller 90 of the portable telephone 80. Further, FIG. 5 is a schematic diagram of a screen displayed on the display 84 of the portable telephone 80 in association with this routine. This routine is stored in an internal ROM (not shown) of the portable telephone 80, and is executed at the time when the user operates on the set of operation buttons 81 of the portable telephone 80 to display a selection menu (see FIG. 5(a)) for selecting an image file to be printed. When the transmission processing routine for IrSimple one-way communication shown in FIG. 4 is executed, first, the portable telephone controller 90 of the portable telephone 80 stores the file name of an image file selected as an image file to be printed by the user operating on the arrow key 81c of the set of operation buttons 81, into the memory 87 every time the user depresses the determination button 81a for verification (step S100). Here, FIG. 5(b) shows a state with a plurality of image files selected by the user in this way. The image files enclosed by the double-lined rectangular box represent the files that have been selected and verified. Next, it is determined whether or not the Ir high-speed transmission button 81d of the set of buttons 81 has been depressed (step S110), and if the Ir high-speed transmission button 81d has not been depressed, the process proceeds to step S100 and the file names of the image files selected and verified by the user are stored once again. On the other hand, if the Ir high-speed transmission button 81d has been depressed, the IrDA controller 89 is controlled so that a frame containing the SNRM command and serving as a connecting signal is transmitted at 9600 bps (step S120), and after a predetermined period of time (for example, 50 ms), the IrDA controller 89 is controlled so that a frame containing image data obtained by splitting an image file corresponding to a file name stored in the memory 87 is transmitted at 4 Mbps (step S130). That is, the image file selected/verified by the user is transmitted on a packet-by-packet basis by one-way communication. Then, after the transmission of the frame containing that image data is terminated, the IrDA controller 89 is controlled so as to transmit a disconnection frame (step S140). Subsequently, the display 84 is controlled so as to perform a display (see FIG. 5(c)) inquiring whether or not to perform retransmission of the image file that has been just transmitted (step S150). Next, it is determined whether or not the Ir high-speed transmission button 81d has been depressed by the user (step S160). If the Ir high-speed transmission button 81d has been depressed, the processing from step S120 onwards is executed. At this time, file names stored in the memory 87 are not changed, which means that the same batch of files as the last one is transmitted. In other words, after transmitting a batch of files once, the user can retransmit the same batch of files as the last one by depressing the Ir high-speed transmission button 81d again. On the other hand, if the Ir high-speed transmission button 81d has not been depressed, it is determined whether or not termination of transmission has been inputted by the user depressing the determination button 81a (step S170). If termination of transmission has not been inputted, the processing from step S160 onwards is executed, and if termination of transmission has been inputted, the file names stored in the memory 87 are cleared (step S180), and the present routine is terminated. In this way, image data is transmitted in a one-sided manner irrespective of the reception state of the multifunction printer 10.

Figure 6:
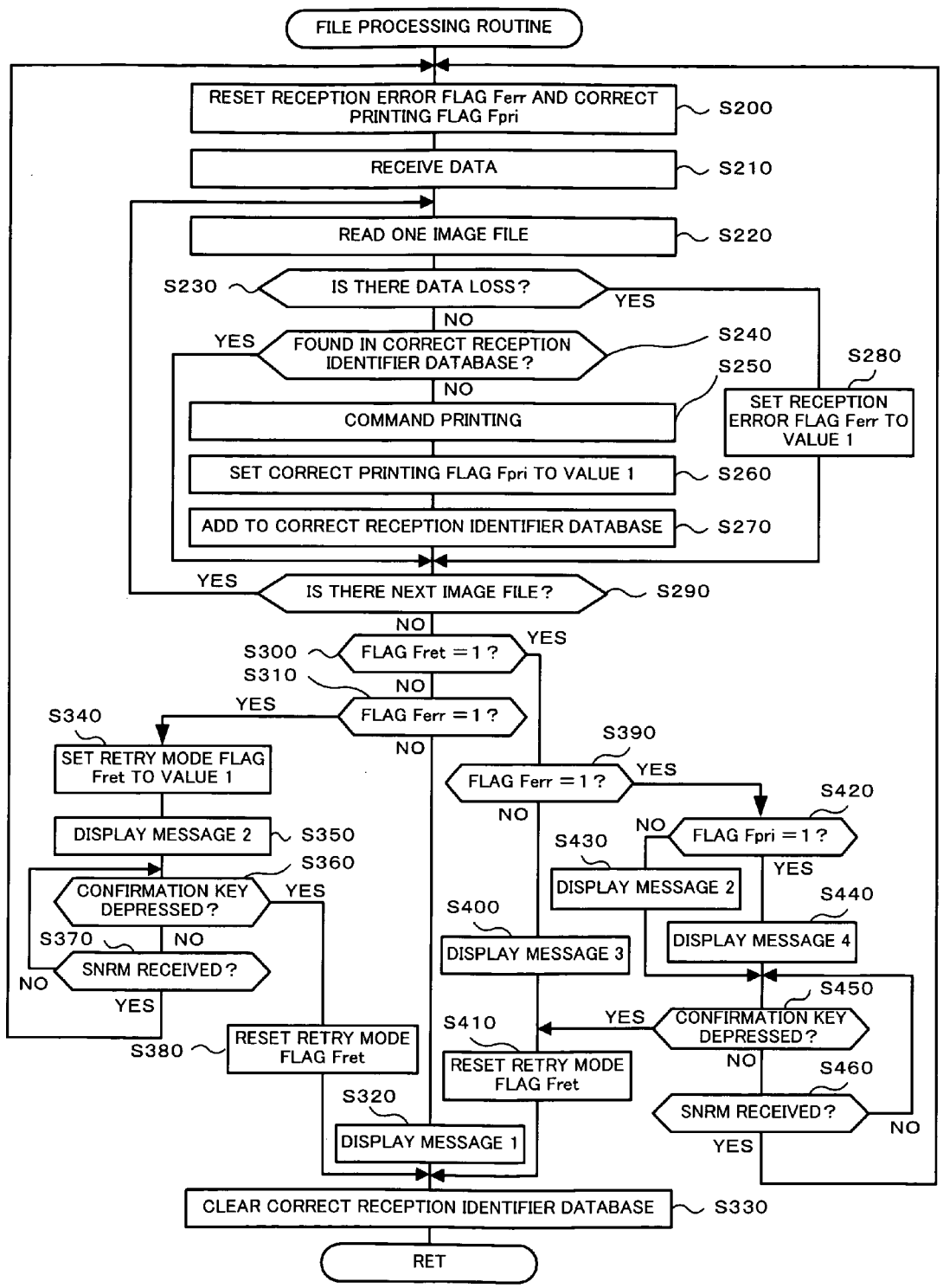
FIG. 6 is a flow chart showing an example of file processing routine according to a first embodiment.

Next, operation of the multifunction printer 10 will be described. FIG. 6 is a flow chart showing an example of file processing routine for IrSimple one-way communication executed by the CPU 72 of the multifunction printer 10. Further, FIG. 7 is a schematic diagram of a screen displayed on the display section 42 of the multifunction printer 10 in association with this routine. This routine is stored in the ROM 74 of the multifunction printer 10, and is executed at the time when the frame containing the SNRM command described above is received. When the multifunction printer 10 is in the reception standby state, the sampling clock of the clock generator 66 is adjusted so that data communicated at a speed of 9600 bps can be received. When this routine is executed, the CPU 72 first resets each of a reception error flag Ferr and a correct printing flag Fpri to the value 0 (step S200). In this case, the reception error flag Ferr is a flag indicating whether or not there is data loss in at least one of the image files received from the portable telephone 80, and is set to the value 1 if it is determined that there is data loss. Further, the correct printing flag Fpri is a flag indicating whether or not a print command has been outputted with respect to at least one of the image files received from the portable telephone 80, and is set to the value 1 after a print command is outputted.

Next, a command is outputted to the IrDA controller 60 so as to receive data transmitted from the portable telephone 80 of the multifunction printer 10, and at the same time, the received data is stored into a buffer area (not shown) of the RAM 76 (step S210). The IrDA controller 60 having received this command adjusts the sampling clock of the clock generator 66 so that data at 4 Mbps can be received, and receives frames containing image data (the frame B, the frame C, and the frame D in FIG. 2, and the like). Then, when a frame (not shown) serving as a disconnecting signal is received, the sampling clock generated from the clock generator 66 is adjusted so that a frame including an SNRM command communicated at a speed of 9600 bps can be received. The CPU 72 stores all the frames inputted from the IrDA controller 60 into the buffer area (not shown) of the RAM 76 once.

Then, a process of reading one image file from the frames stored in the RAM 76 is executed (step S220). At this time, pieces of image data contained in the respective frames are read in the order of the sequence numbers described in the header of the IrSMP protocol, thereby playing back image files that have been transmitted. As described above, the NAME header of the PUT command of the OBEX protocol is contained in the frame that is transmitted first when transmitting one image file, and the ENDBODY header of the PUT command of the OBEX protocol is contained in the frame that is transmitted last. Therefore, a series of frames from the frame containing the NAME header to the frame containing the ENDBODY header can be recognized as a group of frames corresponding to one image file. Then, it is determined whether or not there is data loss in one read image file (step S230). In this case, the determination as to whether or not there is data loss can be made by, for example, checking the sequence numbers described in the headers of the IrSMP protocol of the frames stored in the buffer area (not shown) of the RAM 76, and the NAME header and ENDBODY header of the PUT command of the OBEX protocol. Specifically, data loss can be determined to exist if the sequence numbers described in the headers of the IrSMP protocol contained in the individual frames corresponding to one image file that has been read are not consecutive from the sequence number of the frame containing the NAME header to the sequence number of the frame containing the ENDBODY header. If there is no data loss, it is determined whether or not the file name of that image file exists in a correct reception identifier database (step S240). In this case, the correct reception identifier database is a registry of identifiers (which in this embodiment are file names) of image files with no data loss for which the multifunction printer 10 has outputted a print command while the present routine is executed, and is stored in the RAM 76 of the main controller 70. When the present routine is executed for the first time after the power of the multifunction printer 10 is turned ON, since the correct identifier database is not stored in the RAM 76, the determination in step S240 is negative. If the file name of the read image file does not exist in the correct reception identifier database, it is determined that a print command with respect to that image file has not been outputted yet, and a command is issued to the printer ASIC 22 so as to execute printing on the sheet S on the basis of that image file (step S250). In this embodiment, it is assumed that the print conditions at this time such as the sheet size and the number of sheets to be printed are determined in advance (for example, the sheet size is the picture L size (89×127 mm), the number of sheets is 1, and so on). Subsequently, the correct printing flag Fpri is set to the value 1 so as to indicate that there is an image file for which a print command has been outputted (step S260), and the file name of that image file is added to the correct reception identifier database (step S270). On the other hand, if it is determined in step S240 that the file name of an image file exists in the correct reception identifier database, this means that the image file is one for which a print command has already been outputted, so the processing related to a print command in steps S250 to S270 is not executed. Further, if it is determined in step S230 that there is data loss in an image file, this means that the image file is not complete, and since such an incomplete image file cannot be printed correctly, the reception error flag Ferr is set to the value 1 so as to indicate that a reception error has occurred (step S280).

Subsequently, after the file name of an image file for which a print command has been outputted is added to the correct reception identifier database in step S270, or after the file name of an image file is determined to exist in the correct reception identifier database in step S240, or after the reception error flag Ferr is set to the value 1 in step S280, it is determined whether or not the next image file exists (step S290). In this case, the determination as to whether or not the next image file exists is made in the following manner. For example, when storing the frame received in step S210 described above into the RAM 76, the file name of an image file to which image data contained in that frame belongs is stored in the RAM 76 in advance, and this file name is compared against the file name of the image file that has already been read in step S220. If the next image file exists, the processing from step S220 onwards is executed. The processing of step S280 is executed if there is data loss in the read image file, and if there is no data loss, no processing is executed in a case where the file name of that image file exists in the correct reception identifier database, and the processing of steps S250 to S270 related to a print command is executed in a case where the file name of that image file does not exist in the correct reception identifier database. Such processing is repeated while it is determined in step S290 that the next image file exists, and if the next image file does not exist, it is determined whether or not a retry mode flag Fret has the value 1 (step S300). In this case, the retry mode flag Fret is a flag indicating whether or not the current mode is a retry mode waiting for retransmission of the group of files that have been transmitted this time. The retry mode flag Fret is set at the value 1 when in the retry mode, and is set at the value 0 when not in the retry mode. When the retry mode flag Fret does not have the value 1, it is determined whether or not the reception error flag Ferr has the value 1 (step S310). When the reception error flag Ferr does not have the value 1, that is, when no reception error is occurring, a print command has been outputted with respect to every piece of image data, so the display section 42 is controlled so as to display Message 1 (see FIG. 7(a)) indicating that all the image files have been received correctly (step S320), and the correct reception identifier database is cleared (step S330), and the present routine is terminated.

On the other hand, if it is determined in step S310 that the reception error flag Ferr has the value 1, that is, when a reception error has occurred, the retry mode flag Fret is set to the value 1 (step S340), and the display section 42 is controlled so as to display Message 2 (see FIG. 7(b)) urging retransmission of the same files (step S350). Then, it is determined whether or not a confirmation key (not shown) of the set of buttons 44 for terminating printing of image files has been depressed by the user (step S360). If the confirmation key has not been depressed, it is determined whether or not a frame containing the SNRM command has been received (step S370), and if a frame containing the SNRM command has not been received, the processing of step S360 is executed. That is, until the confirmation key (not shown) of the set of buttons 44 of the multifunction printer 10 is depressed by the user, or until image files are transmitted by the user again, the state waits on standby with the above-described Message 2 (see FIG. 7(b)) displayed on the display section 42. Then, when the user operates on the set of operation buttons 81 of the portable telephone 80 to perform transmission of image files again, and a frame containing the SNRM command is received, the processing from step S200 onwards is performed. On the other hand, if it is determined in step S360 that the confirmation key has been depressed, it is regarded that the user does not wish to continue printing, so the retry mode flag Fret is reset to the value 0 (step S380), and the correct reception identifier database is cleared (step S330), thus terminating the present routine.

If it is determined in step S300 that the retry mode flag Fret has the value 1, that is, if the current mode is the retry mode, it is determined whether or not the reception error flag Ferr has the value 1 (step S390). When the reception error flag Ferr does not have the value 1, that is, when there is no reception error, the display section 42 is controlled so as to display Message 3 (see FIG. 7(c)) indicating that all the image files have been received correctly during a retry (step S400), so the retry mode flag Fret is reset to the value 0 (step S410), and the correct reception identifier database is cleared (step S330), thus terminating the present routine. On the other hand, when the reception error flag Ferr has the value 1, it is determined whether or not the correct printing flag Fpri has the value 1 (step S420). When the correct printing flag Fpri does not have the value 1, that is, when there is no image file for which a print command has been outputted, the display section 42 is controlled so as to display the above-described Message 2 (see FIG. 7(b)) (step S430), and when the correct printing flag Fpri has the value 1, that is, when there is at least one image file for which a print command has been outputted, the display section 42 is controlled so as to display Message 4 (see FIG. 7(d)) indicating that there is an image file that has been received correctly anew during a retry (step S440). Subsequently, after the display section 42 is controlled so as to display Message 2 in step S430, or after the display section 42 is controlled so as to display Message 4 in step S440, it is determined whether or not a confirmation key (not shown) of the set of buttons 44 for terminating printing of image files has been depressed by the user (step S450). If the confirmation key has not been depressed, it is determined whether or not a frame containing the SNRM command has been received (step S460), and if a frame containing the SNRM command has not been received, the processing of step S450 is executed. That is, until the confirmation key (not shown) of the set of buttons 44 of the multifunction printer 10 is depressed by the user, or until image files are transmitted by the user again, the state waits on standby with the above-described Message 2 (see FIG. 7(b)) or Message 4 (see FIG. 7(d)) displayed on the display section 42. Then, when the user performs transmission of image files again, and a frame containing the SNRM command is received, the processing from step S200 onwards is performed. On the other hand, if it is determined in step S450 that the confirmation key has been depressed, it is regarded that the user does not wish to continue printing, so the retry mode flag Fret is reset to the value 0 (step S410), and the correct reception identifier database is cleared (step S330), thus terminating the present routine.

In the above description of the flow chart showing an example of file processing routine for IrSimple one-way communication, when reading one image file in step S220, the image file is read with a series of frames from the frame containing the NAME header to the frame containing the ENDBODY header recognized as a group of frames corresponding to one image file. However, if there is a loss of the frame containing the NAME header or ENDBODY header, a group of frames corresponding one image file cannot be recognized. Accordingly, in step S220, in parallel with the process of reading a group of frames corresponding to one image file, it is also determined whether or not there is a loss of a frame containing the NAME header or ENDBODY header that should have been received. For example, if, after an ENDBODY header, a NAME header is not recognized and the next ENDBODY header is recognized, it is determined that a frame containing a NAME header is lost therebetween. If, after a NAME header, an ENDBODY frame is not recognized and the next NAME header is recognized, it is determined that a frame containing an ENDBODY header is lost therebetween. If there is a loss of a frame containing a NAME header or ENDBODY header, the process immediately proceeds to step S280 where the reception error flag Ferr is reset to the value 1.

Figure 8:
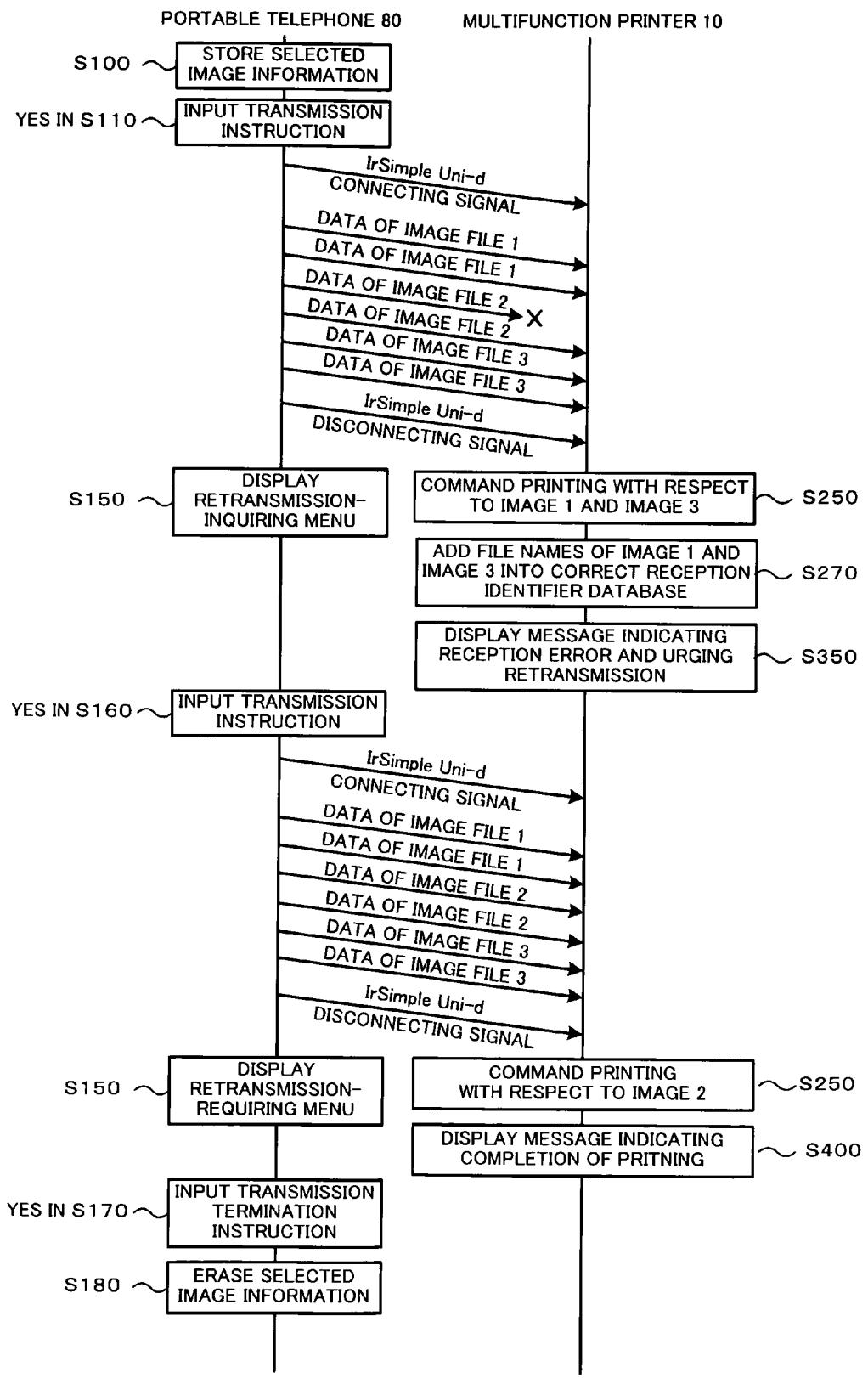
FIG. 8 is a schematic diagram showing a communication procedure including retransmission of files according to the first embodiment.

Now, a description will be given of a specific example of processing in which the multifunction printer 10 receives three image files transmitted from the portable telephone 80 as a batch of files for printing. Specifically, a description will be given of a case in which the multifunction printer 10 could not successfully receive Image File 2, which is the second transmitted image file of the three image files transmitted from the portable telephone 80, so the same three image files are retransmitted by the user, and all the image files are successfully received. FIG. 8 is a sequence chart showing the communication procedure from the transmission of the three image files by the user to the output of a print command after retransmission is performed. The step numbers shown in FIG. 8 are the same as the step numbers used in the transmission processing for IrSimple one-way communication in FIG. 4 and the file processing routine in FIG. 6. First, when the user operates on the set of buttons 81 of the portable telephone 80 and selects image files (in this example, Image File 1, Image File 2, and Image File 3) to be printed, the portable telephone controller 90 of the portable telephone 80 stores the names of the selected image files into the memory 87 (step S100). Then, when the Ir high-speed transmission button 81d of the portable telephone 80 is depressed by the user, and a transmission instruction is inputted, the data of Image File 1, the data of Image File 2, and the data of Image File 3 are transmitted in order (step S130), and a menu inquiring whether or not to perform retransmission is displayed (step S150). Then, as the CPU 72 of the multifunction printer 10 receives the data of Image File 1, the data of Image File 2, and the data of Image File 3 in order, data loss has occurred for some reason with respect to the data of Image File 2. At this time, the CPU 72 outputs a print command to the printer unit 20 only with respect to Image File 1 and Image File 3 (step S250), and stores their file names to the correct reception identifier database (step S270). At the same time, the CPU 72 displays Message 2 (see FIG. 7(b)) indicating that a reception error has occurred (step S350), and waits on standby in this state until the confirmation key (not shown) of the set of buttons 44 is depressed, or until image files are received again. Next, after confirming the above-described Message 2 displayed on the display section 42 of the multifunction printer 10, the user performs an operation of transmitting the previously transmitted group of files again. Then, the portable telephone controller 90 of the portable telephone 80 transmits Image File 1, Image File 2, and Image File 3 stored in the memory 87 which are the same as the ones transmitted last time. The CPU 72 of the multifunction printer 10 receives these pieces of image data correctly, and since a print command has already been outputted with respect to Image File 1 and Image File 3, the CPU 72 outputs a print command to the printer unit 20 only with respect to Image File 2 (step S250). Then, Message 3 (see FIG. 7(c)) indicating that all the files have been received correctly is displayed (step S400), and the processing is terminated. Then, the user confirms that all of the three selected image files have been printed, and depresses the determination button 81a to input an instruction for terminating retransmission. The portable telephone controller 90 of the portable telephone 80 then clears the file names of the three image files stored in the memory 87 (step S180), thus terminating the processing.

Now, the correspondence between constituent elements of this embodiment and constituent elements of the present invention will be clarified. The infrared communications port 50 and the IrDA controller 60 according to this embodiment correspond to the receiving module according to the present invention, the printer unit 20 according to this embodiment corresponds to the processing execution module according to the present invention. Further, the RAM 76 according to this embodiment corresponds to the storage module according to the present invention, the display section 42 according to this embodiment corresponds to the notifying module according to the present invention, and the confirmation key (not shown) of the set of buttons 44 according to this embodiment corresponds to the cancellation instruction inputting module according to the present invention. Furthermore, the IrDA controller 89 and the infrared communications port 88 according to this embodiment correspond to the transmitting module according to the present invention, the Ir high-speed transmission button 81d according to this embodiment corresponds to the transmission instruction inputting module and the retransmission instruction inputting module according to the present invention, and the portable telephone controller 90 according to this embodiment corresponds to the transmission control module according to the present invention. It is to be noted that in this embodiment, an example of file processing method or file transmission method according to the present invention is also illustrated by description of the operation of the multifunction printer 10 or portable telephone 80.

According to the multifunction printer 10 of this embodiment described above in detail, when a plurality of image files selected by the user and transmitted from the portable telephone 80 are received as a batch of files by the infrared communications port 50 and the IrDA controller 60, of the batch of files received this time, the file name of an image file with no data loss is stored into the RAM 76, and also the printer unit 20 is controlled so that print processing of the image file with no data loss is executed. Thereafter, when the same batch of files selected by the user and transmitted from the portable telephone 80 are received by the infrared communications port 50 and the IrDA controller 60 again, the printer unit 20 is controlled so that print processing is executed with respect to, of the image files received this time, a file whose file name was not added to the correct reception identifier database stored in the RAM 76 last time including a name of a file with no data loss and which is determined this time to be a file with no data loss. Accordingly, the user may simply retransmit the same batch of files as that transmitted last time, without performing such cumbersome operation as reselecting an image file for which printing has not been executed and retransmitting the image file, so retransmission can be performed by a simple operation. Further, it is possible to avoid a situation where, when the same batch of files as that transmitted last time is transmitted this time by the user as it is, print processing is repeatedly executed also this time with respect to an image file for which a print command was outputted last time.

Further, when the infrared communications port 50 and the IrDA controller 60 receive a batch of files selected by the user and transmitted from the portable telephone 80, if there is data loss in an image file included in the batch of files, the main controller 70 controls the display section 42 so as to display a message urging the user to retransmit the same batch of files. In this way, in a case where there is data loss in an image file included in the received batch of files and thus printing cannot be performed correctly, it is possible to urge the user to retransmit the same batch of files.

Further, when the infrared communications port 50 and the IrDA controller 60 receive a batch of files selected by the user and transmitted from the portable telephone 80, if there is data loss in an image file included in the batch of files, the main controller 70 clears the correct identifier database stored in the RAM 76 when the confirmation key is depressed by the user. In this way, when a batch of files is transmitted from the portable telephone 80, once an image file that the user really wants to be printed has been printed, a state of standby for retransmission of that batch of files can be cancelled even if there are other image files with a reception error.

Furthermore, since the main controller 70 uses file names of image files as the identifiers, an image file with no data loss and an image file with data loss can be easily differentiated from each other.

On the other hand, according to the portable telephone 80 of this embodiment, when a transmission instruction is inputted by the user by depressing the Ir high-speed transmission button 81*d*, the IrDA controller 89 is controlled so that a plurality of image files (batch of files) are transmitted to the multifunction printer 10, and when a retransmission instruction is inputted by the user by depressing the Ir high-speed transmission button 81*d* again thereafter, the IrDA controller 89 is controlled so that the same batch of files as that transmitted last time is transmitted again. It is thus possible to perform retransmission of a batch of files easily. For this reason, it can be said that the portable telephone 80 is a device suited for transmitting a batch of files to the multifunction printer 10 by IrSimple one-way communication.

It should be noted that the first embodiment described above may be modified as follows.

For example, while in the above-described embodiment the file processing routine in FIG. 6 is performed by using the correct reception identifier database in which the file names (identifiers) of image files with no data loss are registered, the file processing routine in FIG. 6 may be performed by using an erroneous reception identifier database in which the file names of image files with data loss are registered. In this case, if data loss exists in step S230, the process proceeds to step S280 and the reception error flag Ferr is set to the value 1, and also the file name of that image file is registered into the erroneous reception identifier database. On the other hand, if no data loss exists in step S230, in step S240, instead of determining whether or not the file name of that image file exists in the correct reception identifier database, it is determined whether or not the file name exists in the erroneous reception identifier database. If the file name exists, this means that the reception of that image file has failed up until the last time and the image file has not been printed, so a print command is outputted and also the correct printing flag Fpri is set to the value 1 (steps S250, S260), and in step S270, instead of adding its file name to the correct reception identifier database, the file name is deleted from the erroneous reception identifier database. Thereafter, the process proceeds to step S290 where it is determined whether or not the next image file exists. On the other hand, if no file name of an image file with no data loss is found in the erroneous reception identifier database, this means that that the reception of that image file has been successful up until the last time and the image file has already been printed, so the process proceeds to step S290. In step S330, instead of clearing the contents of the correct reception identifier database, the contents of the erroneous reception identifier database are cleared. In this way, the same effect as that of the above-described embodiment can be attained also in the case where the erroneous reception identifier database is used. If there is a loss of the frame containing the NAME header in step S230, the file name of that image file is unknown. Accordingly, instead of the file name, the sequence number contained in that image file may be registered as an identifier into the erroneous reception identifier database. In this case, when performing this routine from the next time onwards, the determination as to whether or not an image file with no data loss is registered in the erroneous reception error database may be made by determining whether or not, in addition to the file name of that image file, the sequence number contained in that image file is registered in the erroneous reception identifier database.

Figure 9:
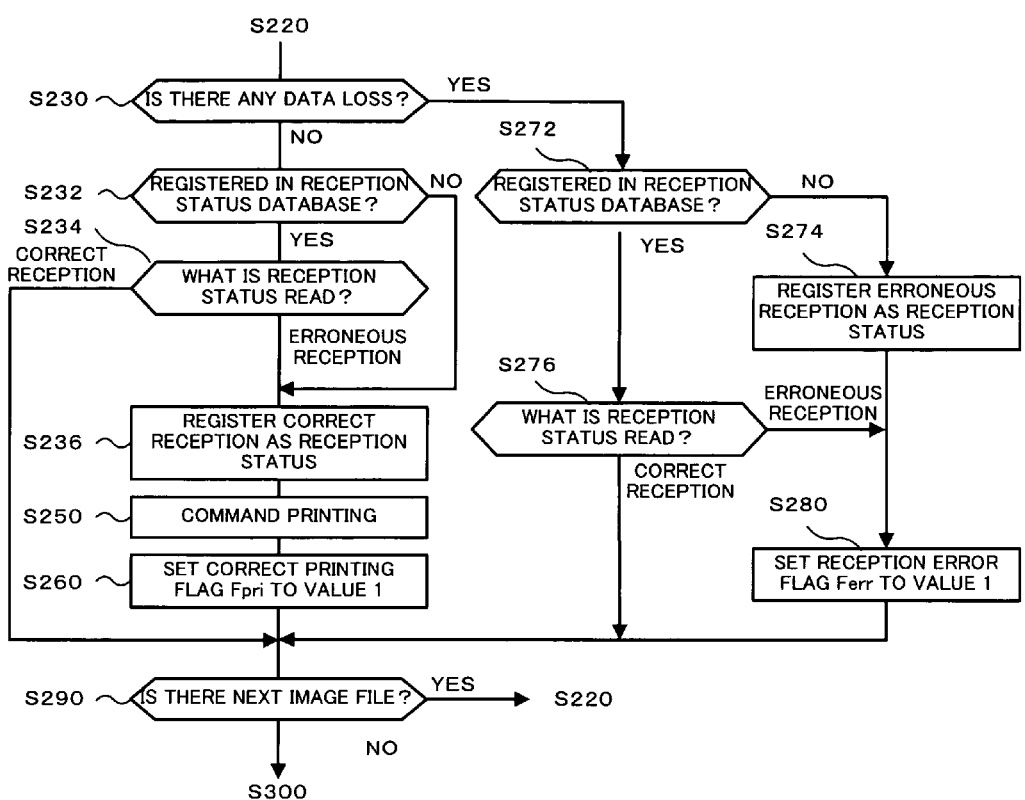
FIG. 9 is a flow chart showing a file processing routine according to a modification of the first embodiment.

Alternatively, the file processing routine may be performed by using a reception status database storing the correspondence between the file name of an image file and its reception status (correct reception or erroneous reception). At this time, instead of the processing executed in steps S230 to S290 of the file processing routine in FIG. 6, the processing in FIG. 9 is executed. That is, when there is no data loss in step S230, it is determined whether or not the file name of that image file is registered in the reception status database (step S232). If the file name is not registered, that file name and its corresponding reception status (which is correct reception at this time) are registered into the reception status database in association with each other (step S236), a print command is outputted and also the correct printing flag Fpri is set to the value 1 (steps S250, S260), and the processing proceeds to step S290. When the file name of that image file is registered in the reception status database in step S232, the reception status corresponding to that file name is read, and it is determined whether the reception status thus read is correct reception or erroneous reception (step S234). If the reception status is erroneous reception, the process proceeds to step S236 where correct reception is written over as the reception status, and since that image file has been neither correctly received nor printed up until the last time, the process proceeds to step S290 via the processing of steps S250, S260. Further, if the read reception status is correct reception in step S234, since that image file has already been correctly received and printed by the last time, the process proceeds to step S290 directly. On the other hand, if there is data loss in step S230, it is determined whether or not the file mane of that image file is registered in the reception status database (step S272). If the file name is not registered, that file name and its corresponding reception status, that is, erroneous reception, are registered into the reception status database in association with each other (step S274), the reception error flag Ferr is set to the value 1 (step S280), and the process proceeds to step S290. On the other hand, if that file name is registered in the reception status database in step S272, the reception status corresponding to that file name is read, and it is determined whether or not the reception status thus read is correct reception or erroneous reception (step S276). If the reception status is correct reception, since that image file since that image file has already been correctly received and printed by the last time, the process proceeds to step S290, and if the reception status is erroneous reception, the process proceeds to step S290 via step S280. In step S330, instead of clearing the contents of the correct reception identifier database, the contents of the erroneous reception identifier database are cleared. In this way, the same effect as that of the above-described embodiment can be attained also in the case where the reception status database storing the correspondence between the file name (identifier) of an image file and the reception status is used. It should be noted that if there is a loss of a frame containing the NAME header or ENDBODY header, a group of frames corresponding to one image file cannot be recognized in step S220, so the process immediately proceeds to step S280.

While in the above-described embodiment the display section 42 is controlled so that various kinds of message are displayed in steps S320, S350, S400, S430, and S440 in FIG. 6, this may be accomplished by any suitable means as long as it can notify the user of the reception status or processing status. For example, instead of the display section 42 or in addition to the display section 42, a voice message may be outputted from a speaker or a lamp may be lighted.

Figure 10:
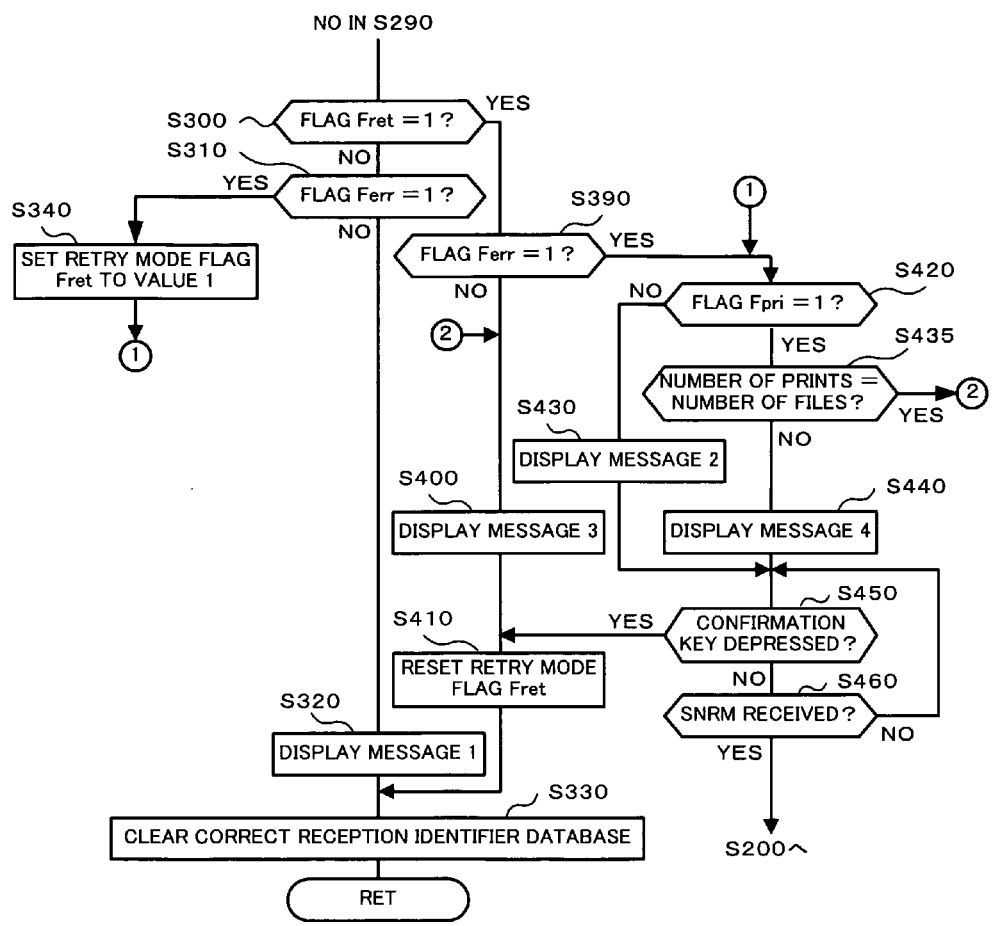
FIG. 10 is a flow chart showing a file processing routine according to a modification of the first embodiment.

The processes from step S300 onwards according to the above-described embodiment may be modified as shown in FIG. 10. In FIG. 10, the same step numbers are assigned to the same processes as those in FIG. 6. In FIG. 10, when the retry mode flag Fret has the value 1 in step S300, the reception error flag Ferr has the value 1 in step S390, and the correct printing flag Fpri has the value 1 in step S420, it is determined whether or not the number of times a print command has already been outputted (number of prints) is equal to the number of image files that have been received (step S435). In this case, the number of files refers to the number of files that are read after the file processing routine is started until the determination that the next image file does not exist is made for the first time. It should be noted that when reading one image file in step S220, even if there is a loss of a frame containing the NAME header or a frame containing the ENDBODY header, it is regarded that there is one image file. Further, the number of prints refers to the total number of print commands outputted in step S250. If the number of prints and the number of files are equal in step S435, this means that even through a reception error has occurred this time, a print command has been outputted with respect to all the image files (that is, the image file with respect to which a reception error has occurred this time had been correctly received by the last time and hence a print command has already been outputted). Accordingly, the display section 42 is controlled so as to display Message 3 indicating that reception has finished correctly (step S400), the retry mode flag Fret is reset (step S410), the correct reception identifier database is cleared (step S330), and the present routine is terminated. Further, if the retry mode flag Fret does not have the value 1 in step S300 and the reception error flag Ferr has the value 1 in step S310, the retry mode flag Fret is set to the value 1 (step S340), and then the process skips to step S420. In this way, even if an image file with respect to which a reception error has occurred this time exists, if a print command has already been outputted with respect to all the image files, Message 3 (message indicating that file reception has finished correctly in the retry mode) is displayed. If, when receiving image files for the first time, image files with respect to which an error has occurred and image files that have been received correctly both exist, and a print command is outputted with respect to the image files that have been received correctly, Message 4 (message indicating that although an error occurred during file reception, there are some files that have been printed correctly) is displayed.

Second Embodiment

Figure 11:
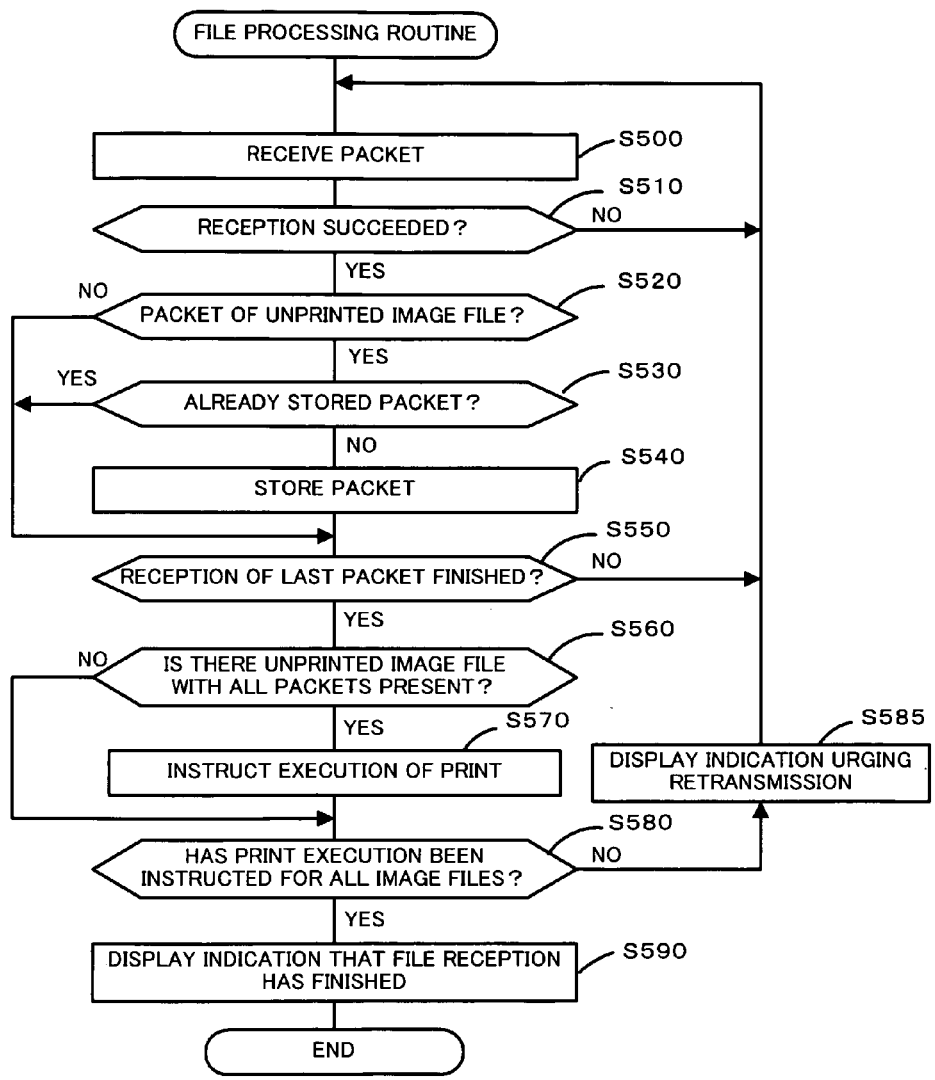
FIG. 11 is a flow chart showing a file processing routine according to a second embodiment.

A second embodiment is the same as the multifunction printer 10 according to the first embodiment except that a file processing routine different from that of the first embodiment is executed. Accordingly, constituent elements that are the same as those of the first embodiment are denoted by the same symbols, and description thereof is omitted. In the following, as in the first embodiment, a description will be given of operation of the multifunction printer 10 when receiving a plurality of image files on a packet-by-packet basis by one-way communication. FIG. 11 is a flow chart showing an example of file processing routine for IrSimple one-way communication executed by the CPU 72 of the multifunction printer 10. This routine is stored in the ROM 74, and is executed upon receiving a frame containing the SNRM command.

When this file processing routine is started, the CPU 72 of the multifunction printer 10 receives a packet that has been sent (step S500). Subsequently, it is determined whether or not packet reception has succeeded (step S510). If packet reception has failed due to such reason that the communication distance from the transmitting party is too long, the process returns to step S500, and the next packet is received.

On the other hand, if packet reception has succeeded, it is determined whether or not the received packet is a packet of an image file that has not been printed (step S520). The RAM 76 includes a communication data storage area (corresponding to the packet storing module) (not shown). In this communication data storage area, with respect to a successfully received packet, an image file name, payload data (containing the SMP header (containing DL and BL, sequence numbers, and the like) and the OBEX user data), and the FCS are stored in association with each other (for the SMP header, the OBEX user data, and the FCS, see FIG. 3). As the FCS, as in the first embodiment, CRC that can be regarded as a value unique to each packet is stored. The sequence numbers are numbered consecutively from the value 0 irrespective of the number of image files that are transferred. For example, if the sequence numbers for the first image file run from the value 0 to 499, the sequence numbers for the second image file start at the value 500. Further, in the communication data storage area, an image file name and print status (not printed yet or already printed) are stored in association with each other. If the current received packet is a packet of an image file that has not been printed yet, it is determined whether or not the packet has already been stored in the communication data storage area (step S530), and if the packet has not been stored yet, the current packet is stored into the data communication storage area (step S540). Specifically, with respect to the current packet, the image file name, the IrSMP frame payload data, and the FCS are stored into the communication data storage area in association with each other.

Then, after step S540, if in step S520 the current packet is part of an image file that has already been printed, or if in step S530 the current packet is a packet that has already been stored, it is determined whether or not the current packet is the last packet (step S550). If the DL and BL of the SMP header of the current packet both have the value 1, the packet is determined to be the last packet. Otherwise, it is determined that the packet is not the last packet. In a case where reception of the last packet has failed, a packet-not-received state continues since there is no next packet. Accordingly, for the sake of convenience, the reception of the last packet is determined to have finished also in a case where the packet-not-received state has continued for a predetermined period of time or more. If the current packet is not the last packet, the process returns to step S500 again, and the next packet is received. On the other hand, if the current packet is the last packet, it is determined whether or not there is a correct image file (image file with no missing sequence number) that has not been printed yet (step S560). If such an image file exists, a print execution instruction for that image file is outputted to the printer unit 20 (step S570). After step S570, or if no correct image file that has not been printed yet is found in step S560, it is determined whether or not a print execution instruction has been outputted to the printer unit 20 with respect to all the image files (step S580). If an image file with respect to which a print execution instruction has not been outputted yet remains, this means that an image file with missing sequence numbers remains, so a message urging retransmission of the current transmitted batch of image files is displayed on the display section 42 of the operation panel 40 (step S585), and the process returns to step S500 and a packet is received again. It should be noted that if an image file whose file name is unknown exists, the determination in step S580 is negative. On the other hand, if in step S580 a print execution instruction has been outputted to the printer unit 20 with respect to all the image files, a message indicating that reception of image files has finished correctly is displayed on the display section 42 of the operation panel 40 (step S590), and the present routine is terminated.

Now, with reference to FIG. 12, a specific description will be given of the processing in which the multifunction printer 10 prints one image file P of a plurality of image files (batch of files) that have been transmitted from the portable telephone 80. FIG. 12 is a schematic diagram showing a transfer procedure and reception results. In this case, it is assumed that the image file P is split in five, and five packets with sequence numbers 0 to 4 are transmitted in this order. If, at the first transfer, the multifunction printer 10 has received the last packet (packet with the sequence number 4) of this image file P, it is assumed that the packets with the sequence numbers 0, 2, 4 have been successfully received and stored into the communication data storage area, but the packets with the sequence numbers 1, 3 have not been successfully received and hence have not been stored. In this case, since there is no correct image file that has not been printed yet, retransmission is urged through the display section 42 of the operation panel 40. Thereafter, the user retransmits the same batch of files from the portable telephone 80. Now, suppose that upon this second transfer, the multifunction printer 10 has successfully received the packet with the sequence number 0 with respect to the image file P. However, since this packet has already been stored, the packet is not stored at this time. Then, suppose that the packet with the sequence number 1 has been successfully received. Since this packet had not been stored yet at the time of first transfer, the packet is stored at this time. Then, suppose that the packet with the sequence number 2 is successfully received. However, since this packet has already been stored, the packet is not stored at this time. Then, suppose that the packet with the sequence number 3 has been successfully received. Since this packet had not been stored yet at the time of first transfer, the packet is stored at this time. Then, suppose that the packet with the sequence number 4 has been successfully received. However, since this packet has already been stored, the packet is not stored at this time. As a result, at the point when the multifunction printer 10 receives the last packet at the time of second transfer, the image file P has become an image file with no missing sequence number. Since this image file P has not been printed yet, a print execution instruction is outputted to the printer unit 20. In this way, even if all of the five packets with the sequence numbers 0 to 4 could not be successfully received neither at the first transfer nor the second transfer, printing is executed if all the packets eventually arrive by the first transfer and the second transfer complementing each other.

The multifunction printer 10 of this embodiment described above in detail provides the same effect as that of the first embodiment. For example, the user may simply retransmit the same batch of files as the last one as it is without performing such cumbersome operation as reselecting an image file whose printing has not been executed and retransmitting the image file, so retransmission can be performed by a simple operation. In addition, instead of waiting for all the packets of a single image file to be received correctly by a single receiving operation, it is waited for all the packets to arrive while adding up packets correctly received by performing a receiving operation a plurality of times in a complementing manner. Therefore, even in situations where a reception error is liable to occur, the image file can be stored as a correct file relatively early, which in turn makes it possible to obtain a print of that image file relatively early.

It should be noted that the above-described second embodiment may be modified as follows.

Figure 13:
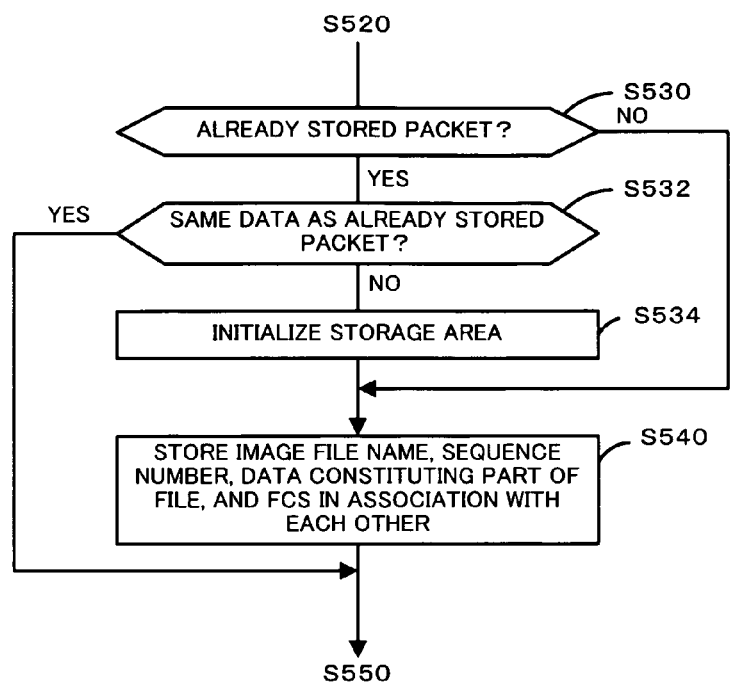
FIG. 13 is a flow chart showing a file processing routine according to a modification of the second embodiment.

That is, in the above-described embodiment, if, in step S530 shown in FIG. 11, the current received packet is a packet of an image file that has not been printed yet but the packet has been already stored in the communication data storage area, the process proceeds to step S550 where it is determined whether or not the current packet is the last packet. However, the following configuration is also possible. That is, as shown in FIG. 13, if, in step S530, the current received packet is a packet of an image file that has not been printed yet but the packet has been already stored in the communication data storage area, it is determined whether or not the current packet and the already stored packet contain the same data (step S532). If the two packets contain the same data, the process proceeds to step S550, and if the two packets contain different data, it is regarded that different image files have been transmitted, so the communication data storage area is initialized (step S534), the current packet is stored into the communication data storage area (step S540), and thereafter the process proceeds to step S550. Even if sequence numbers of packets are the same, there are cases where the current batch of files transmitted from the portable telephone 80 differs from the last one. This is why it is determined whether or not packets contain the same data in FIG. 12. In this case, the determination as to whether or not the current packet and the already stored packet contain the same data may be made by comparing their pay load data (see FIG. 3) to check whether or not they match, or may be made on the basis of whether or not their CRCs stored as the FCSs match.

Figure 14:
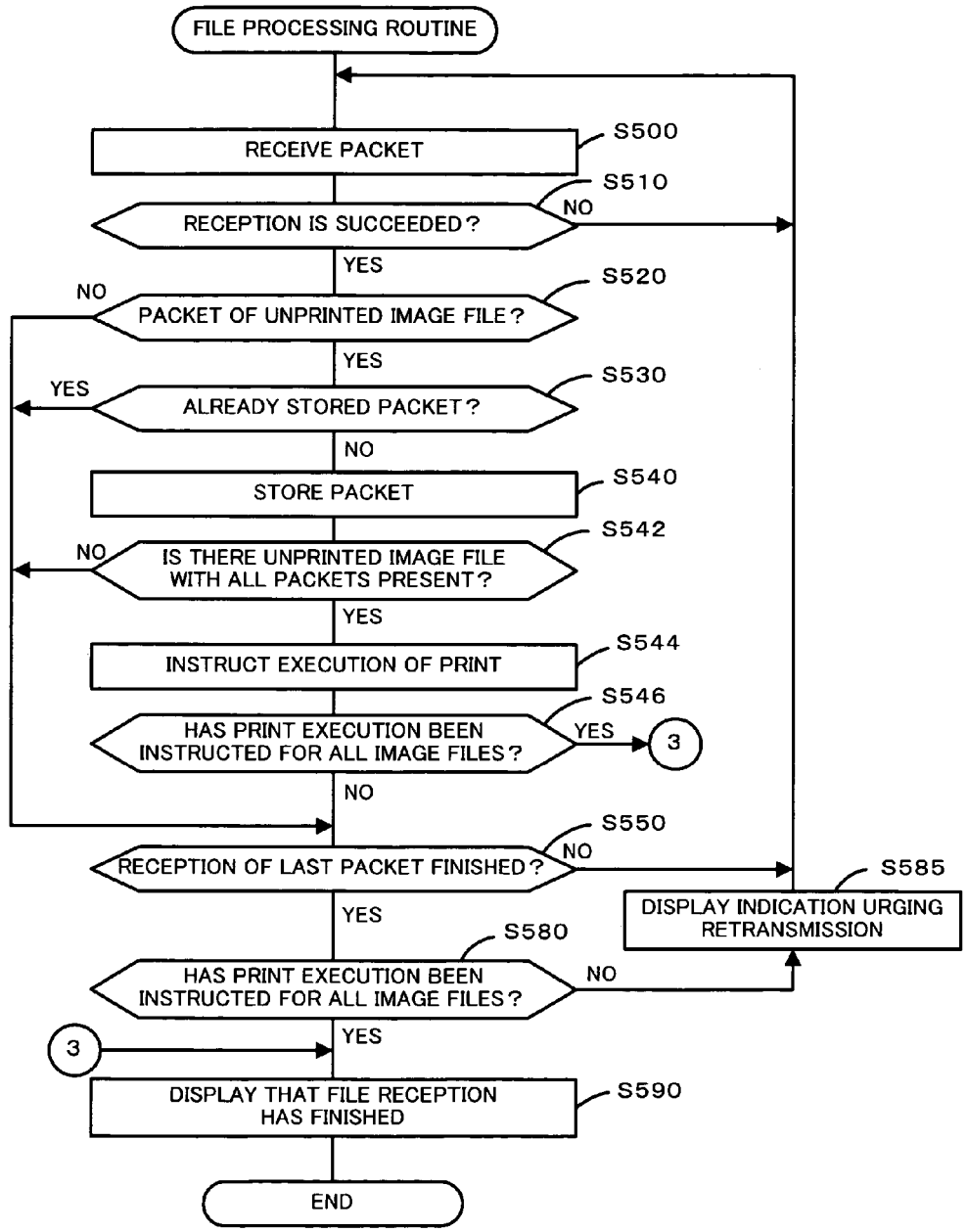
FIG. 14 is a flow chart showing a file processing routine according to a modification of the second embodiment.
Figure 15:
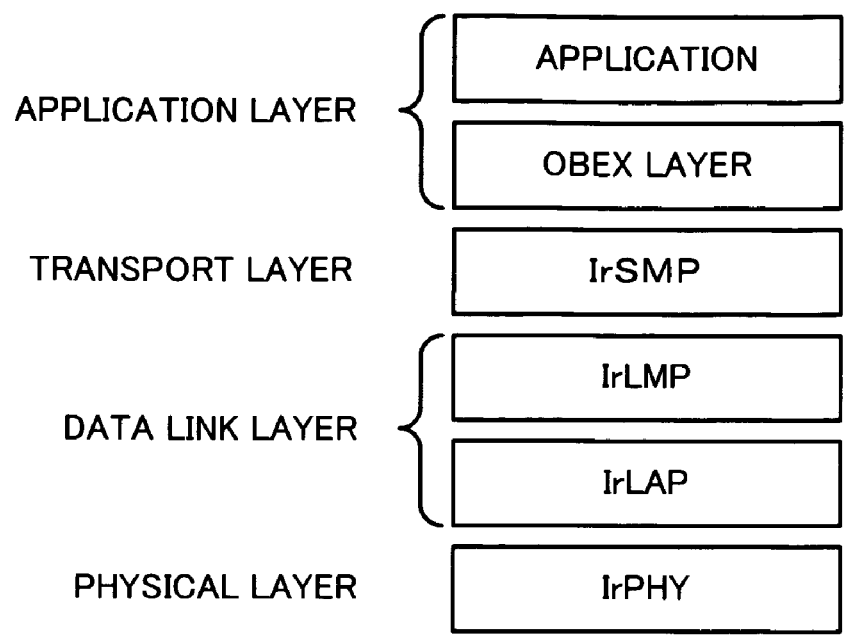
FIG. 15 is a schematic diagram of the layer structure of IrSimple.

While the file processing routine in FIG. 11 is adopted in the above-described embodiment, the file processing routine in FIG. 14 may be adopted. Of the file processing routine in FIG. 14, steps in which the same processes as those of the file processing routine in FIG. 11 are performed are denoted by the same step numbers. In the file processing routine in FIG. 14, after the current packet is stored into the communication data storage area in step S540, it is determined whether or not a correct image file (image file with no missing sequence number) that has not been printed yet exists (step S542). If such an image file exists, a print execution instruction for that image file is outputted to the printer unit 20 (step S544), and it is determined whether or not a print execution instruction has been outputted to the printer unit 20 with respect to all the image files (step S546). Then, if in step S546 a print execution instruction has not been outputted to all the image files, or if in step S520 the current packet is part of an image file that has already been printed, or if in step S530 the current packet is a packet that has been already stored, it is determined whether or not the current packet is the last packet (step S550). If the current packet is not the last packet, the process returns to step S500 again, and the next packet is received. On the other hand, if the current packet is the last packet, it is determined whether or not a print execution instruction has been outputted to the printer unit 20 with respect to all the image files (step S580). If image files for which a print execution instruction has not been outputted yet remain, this means that image files with missing sequence numbers remain, so a message urging retransmission of the current transmitted set of image files is displayed on the display section 42 of the operation panel 40 (step S585), and the process returns to step S500 and packets are received again. As for the message, Message 2 in FIG. 7(*b*) may be displayed if there is no file for which a print execution is instructed this time, and Message 4 in FIG. 7(*d*) may be displayed if there is a file for which a print execution is instructed. On the other hand, if in step S580 or step S546 a print execution instruction has been outputted with respect to all the image files, an indication that reception of image files has finished correctly is displayed on the display section 42 of the operation panel 40 and also the communication data storage area is reset (step S590), and the present routine is terminated.

Accordingly, for example, in a case where the last, unprinted image file of a batch of files is received, if, with respect to that image file, only the packet with the sequence number 2 was missing and not yet stored at the time of first reception, and the packet with the sequence number 2 was already stored at the time of second transfer, since all the packets of the image file become complete at the time when the packet with the sequence number 2 is stored, the reception of that image file is finished before receiving the packet with the sequence number 3 and onwards. That is, although in the above-described embodiment it is necessary to receive the last packet (that is, the one with the sequence number 4), in this example, the reception process can be finished before receiving the last packet. Therefore, the time for which the user keeps pointing the portable telephone 80 toward the receiving section of the multifunction printer 10 can be made short.

Other Embodiments

It is needless to mention that the present invention is by no means limited to the above-described embodiments, and can be carried out in various modes without departing from the technical scope of the present invention.

For example, while in the above-described first and second embodiments the file name of an image file is used as the identifier, the identifier is not limited to one using the file name as long as it uses information that can identify a file. For example, a data sequence created from an image file itself by using a hash value generation algorithm, a CRC value generation algorithm using the Hamming code, or the like may be used, or the creation date, hour, minute, and second of an image file or the size of an image file, sequence numbers contained in an image file, or the like may be used.

While in the above-described first and second embodiments the portable telephone 80 is exemplified as infrared communications equipment that transmits files, a digital still camera or video camera, a personal computer, or the like may be used as the infrared communications equipment that transmits files. While the multifunction printer 10 is exemplified as a file processing device, the file processing device is not limited to the multifunction printer 10. For example, a laser printer or photo printer, a television, audio equipment, a portable telephone other than the portable telephone 80, a personal computer, or the like may be used as the file processing device. While an image file is exemplified as the file that is transmitted by IrSimple one-way communication, the file may be a file other than an image file (such as a music file). The print head (not shown) of the printer engine 24 of the multifunction printer 10 may adopt a method in which ink is pressurized by deforming a piezoelectric element, or may adopt a method in which ink is pressurized by bubbles generated by applying voltage to a heat element (for example, a heater).

While in the above-described first and second embodiments the description is directed to a case where the present invention is applied to an application in which one-way communication is performed by using infrared radiation, the communication medium is not limited to this. For example, the present invention may be applied to an application in which one-way communication is performed by using radio waves, or may be applied to an application in which one-way communication is preformed by using cables.

The present application claims priority based on Japanese Patent Application No. 2006-273379 filed on Oct. 4, 2006 and Japanese Patent Application No. 2007-222986 filed on Aug. 29, 2007, the entire contents of which are incorporated herein by reference.

What is claimed is:

1. A file processing device, comprising:
a receiving module that receives a plurality of files as a batch of files from a user-operated communicating party by one-way communication;
a processing execution module that executes predetermined output processing on the basis of files received by the receiving module;
a processing control module which, if a file with no data loss exists in the batch of files received by the receiving module, controls the processing execution module to execute the predetermined output processing on the basis of the file with no data loss, and which, if a file with data loss exists in the batch of files received by the receiving module, waits for the receiving module to receive the batch of files again, and when the receiving module receives the batch of files again, controls the processing execution module to execute the predetermined output processing on the basis of a file in the batch of files for which the predetermined output processing has not been executed and whose data loss has been corrected;
a storage module that can store identifiers of files received by the receiving module;
wherein the processing control module stores, of a plurality of files included in the batch of files received by the receiving module, an identifier of a correct tile with no data loss and an identifier of an erroneous file with data loss in a different manner from each other into the storage module, and if a correct file exists in the batch of files, the processing control module controls the processing execution module to execute the predetermined output processing on the basis of the correct file, and if an erroneous file exists in the batch of files, the processing control module waits for the receiving module to receive the batch of files from the communicating party again, and when the receiving module receives the batch of files from the communicating party again, the processing control module controls the processing execution module regards only an identifier of a file which has not been stored in the storage module as a correct file up until the last reception time and which is determined to be a correct file this reception time as an identifier of a correct file and executes the predetermined output processing on the basis of the file; and
wherein the predetermined output processing is print processing.

2. The file processing device according to claim 1, further comprising a notifying module for notifying a user of information,
wherein if an erroneous file exists in the batch of files, the processing control module controls the notifying module so as to urge a user to retransmit the batch of files, and waits for the receiving module to receive the batch of files from the communicating party again.

3. The file processing device according to claim 1, further comprising a cancellation instruction inputting module that allows a user to input a standby cancellation instruction for canceling a standby state in which retransmission of the batch of files is waited for,
wherein if an erroneous file exists in the batch of files, the processing control module determines whether or not the standby cancellation instruction has been inputted by a user via the cancellation instruction inputting module, and if the standby cancellation instruction has been inputted, the processing control module controls the storage module so as to reset a storage state with respect to the identifier.

4. The file processing device according to claim 1, wherein the processing control module uses a file name as the identifier.

5. A file processing device, comprising:
a receiving module that receives a plurality of files as a batch of files from a user-operated communicating party by one-way communication;
a processing execution module that executes predetermined output processing on the basis of files received by the receiving module;
a processing control module which, if a file with no data loss exists in the batch of files received by the receiving module, controls the processing execution module to execute the predetermined output processing on the basis of the file with no data loss, and which, if a file with data loss exists in the batch of files received by the receiving module, waits for the receiving module to receive the batch of files again, and when the receiving module receives the batch of files again, controls the processing execution module to execute the predetermined output processing on the basis of a file in the batch of files for which the predetermined output processing has not been executed and whose data loss has been corrected;
wherein the predetermined output processing is print processing;
wherein the receiving module receives the plurality of files from the communicating party on a packet-by-packet basis by one-way communication; and
wherein if a file with all of its packets present exists in the batch of files, the processing control module controls the processing execution module executes the predetermined output processing on the basis of the file with all of its packets present, and if a file with any of its packets missing exists in the batch of files, the processing control module waits for the receiving module to receive the batch of files from the communicating party again on a packet-by-packet basis, and when the receiving module receives the batch of files from the communicating party again on a packet-by-packet basis, the processing control module controls the processing execution module to execute the predetermined output processing on the basis of a file in the batch of files, for which the predetermined output processing has not been executed and all packets have been completed.

6. The file processing device according to claim 5, further comprising a storage module that can store identifiers of files received by the receiving module,
wherein the processing control module stores, of a plurality of files included in the batch of files received by the receiving module, an identifier of a correct file with no data loss and an identifier of an erroneous file with data loss in a different manner from each other into the storage module, and if a correct file exists in the batch of files, the processing control module controls the processing execution module to execute the predetermined output processing on the basis of the correct file, and if an erroneous file exists in the batch of files, the processing control module waits for the receiving module to receive the batch of files from the communicating party again, and when the receiving module receives the batch of files from the communicating party again, the processing control module controls the processing execution module regards only an identifier of a file which has not been stored in the storage module as a correct file up until the last reception time and which is determined to be a correct file this reception time as an identifier of a correct file and executes the predetermined output processing on the basis of the file.

7. The file processing device according to claim 6, further comprising a notifying module for notifying a user of information,
wherein if an erroneous file exists in the batch of files, the processing control module controls the notifying module so as to urge a user to retransmit the batch of files, and waits for the receiving module to receive the batch of files from the communicating party again.

8. The file processing device according to claim 6, further comprising a cancellation instruction inputting module that allows a user to input a standby cancellation instruction for canceling a standby state in which retransmission of the batch of files is waited for,
wherein if an erroneous file exists in the batch of files, the processing control module determines whether or not the standby cancellation instruction has been inputted by a user via the cancellation instruction inputting module, and if the standby cancellation instruction has been inputted, the processing control module controls the storage module so as to reset a storage state with respect to the identifier.

9. The file processing device according to claim 6, wherein the processing control module uses a file name as the identifier.

10. The file processing device according to claim 5, wherein:
the processing control module stores into a predetermined packet storing module a correct packet that has been correctly received by the receiving module, and if a file with all of its packets stored in the packet storing module as correct packets exists in the batch of files, the processing control module controls the processing execution module to execute the predetermined output processing on the basis of the file, and if a file with any of its packets not stored in the packet storing module as a correct packet exists in the batch of files, the processing control module waits for the receiving module to receive the batch of files from the communicating party again on a packet-by-packet basis, and when the receiving module receives the batch of files from the communicating party again on a packet-by-packet basis, the processing control module controls the processing execution module to execute the predetermined output processing on the basis of a file in the batch of files, for which the predetermined output processing has not been executed and all packets are stored in the packet storing module as correct packets.

11. The file processing device according to claim 5, further comprising a notifying module for notifying a user of information,
wherein as the receiving module receives the batch of files from the communicating party again on a packet-by-packet basis, when all packets are completed with respect to the last file of the batch of files for which the predetermined output processing has not been executed, the processing control module controls the notifying module to notify a user of an immediate end of reception before reception of the remaining packets of the file ends.

12. A file processing method using computer software for receiving a plurality of files as a batch of files from a communicating party by one-way communication, and executing predetermined output processing on the basis of the received files, comprising the steps of:

(a) controlling a processing execution module, if a file with no data loss exists in the batch of files received from the communicating party, to execute the predetermined output processing on the basis of the file with no data loss, the communicating party being operated by a user;

(b) waiting for a receiving module to receive the batch of files from the communicating party again if a file with data loss exists in the batch of files received from the communicating party, and when the receiving module receives the batch of files from the communicating party again, controlling the processing execution module to execute the predetermined output processing on the basis of a file, for which when data loss is corrected with respect to a file in the batch of files for which the predetermined output processing has not been executed and whose data loss has bee corrected;

(c) storing, of a plurality of files included in the batch of files received by the receiving module, an identifier of a correct file with no data loss and an identifier of an erroneous file with data loss in a different manner from each other, and if a correct file exists in the batch of files, controlling the processing execution module to execute the predetermined output processing on the basis of the correct file, and if an erroneous file exists in the batch of files, waiting for the receiving module to receive the batch of files from the communicating party again, and when the receiving module receives the batch of files from the communicating party again, controlling the processing execution module regards only an identifier of a file which has not been stored in the storage module as a correct file up until the last reception time and which is determined to be a correct file this reception time as an identifier of a correct file and executes the predetermined output processing on the basis of the file; and wherein the predetermined output processing is print processing.

* * * * *